(12) United States Patent
Okamura et al.

(10) Patent No.: US 10,232,807 B2
(45) Date of Patent: Mar. 19, 2019

(54) CONTROL APPARATUS FOR BOOST CONVERTER

(75) Inventors: Masaki Okamura, Toyota (JP); Naoyoshi Takamatsu, Shizuoka-ken (JP); Kosuke Hirano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 640 days.

(21) Appl. No.: 14/413,335

(22) PCT Filed: Jul. 10, 2012

(86) PCT No.: PCT/JP2012/067613
§ 371 (c)(1),
(2), (4) Date: Jan. 7, 2015

(87) PCT Pub. No.: WO2014/010028
PCT Pub. Date: Jan. 16, 2014

(65) Prior Publication Data
US 2015/0191133 A1    Jul. 9, 2015

(51) Int. Cl.
*B60R 16/02*    (2006.01)
*H02M 3/158*    (2006.01)
(Continued)

(52) U.S. Cl.
CPC .............. *B60R 16/02* (2013.01); *B60L 7/14* (2013.01); *B60L 11/005* (2013.01);
(Continued)

(58) Field of Classification Search
CPC ........ B60R 16/02; B60R 16/00; H02M 3/158; H02M 3/00; B60L 7/00; B60L 11/00; B60L 15/00
(Continued)

(56) References Cited

U.S. PATENT DOCUMENTS

2006/0055349 A1*  3/2006  Nakayama ............ B60L 11/123
                                                    318/400.18
2006/0162972 A1   7/2006  Hoshiba et al.
2012/0069613 A1*  3/2012  Nakagawa ........ H02M 7/53871
                                                    363/78

FOREIGN PATENT DOCUMENTS

CN            1819934 A    8/2006
CN          102460925 A    5/2012
(Continued)

*Primary Examiner* — Rexford Barnie
*Assistant Examiner* — Joseph Inge
(74) *Attorney, Agent, or Firm* — Hunton Andrews Kurth LLP

(57) ABSTRACT

A control apparatus for the boost converter to reduce the total loss is proposed. The control apparatus for the boost converter which controls the boost converter in a power system, the system has a DC power source having source voltage; the boost converter including a switching device and boosting the source voltage by predetermined boost control including change of switching state of the switching device based on boost instruction voltage and outputs the boosted voltage to a load apparatus; and a voltage detecting device detecting output voltage of the boost converter, the control apparatus has: a boost controlling device performing the boost control; and an intermittent controlling device performing intermittent process of the boost control based on the detected output voltage to keep the output voltage within range including the boost instruction voltage which is used when the last boost control is performed.

12 Claims, 16 Drawing Sheets

(51) Int. Cl.
  *B60L 7/14* (2006.01)
  *B60L 11/00* (2006.01)
  *B60L 11/12* (2006.01)
  *B60L 11/14* (2006.01)
  *B60L 15/00* (2006.01)
  *B60L 15/20* (2006.01)
  *H02M 7/797* (2006.01)
  *H02M 1/00* (2006.01)

(52) U.S. Cl.
  CPC .......... *B60L 11/123* (2013.01); *B60L 11/14* (2013.01); *B60L 15/007* (2013.01); *B60L 15/2009* (2013.01); *B60L 15/2054* (2013.01); *H02M 3/158* (2013.01); *H02M 3/1588* (2013.01); *B60L 2210/14* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2240/527* (2013.01); *B60L 2240/547* (2013.01); *B60L 2240/549* (2013.01); *B60L 2240/80* (2013.01); *B60L 2250/26* (2013.01); *H02M 7/797* (2013.01); *H02M 2001/007* (2013.01); *H02M 2001/0035* (2013.01); *Y02T 10/6217* (2013.01); *Y02T 10/645* (2013.01); *Y02T 10/7022* (2013.01); *Y02T 10/7077* (2013.01); *Y02T 10/7225* (2013.01); *Y02T 10/7241* (2013.01); *Y02T 10/7275* (2013.01)

(58) Field of Classification Search
  USPC ......................................................... 307/9.1
  See application file for complete search history.

(56) References Cited

FOREIGN PATENT DOCUMENTS

| JP | H03-113986 U | 11/1991 |
|----|--------------|---------|
| JP | 2534217 Y2 | 4/1997 |
| JP | 2006074932 A | 3/2006 |
| JP | 2010-247725 A | 11/2010 |
| JP | 2010-283932 A | 12/2010 |
| JP | 2011-015603 A | 1/2011 |
| WO | 2004/114511 A2 | 12/2004 |

\* cited by examiner

[FIG. 1]
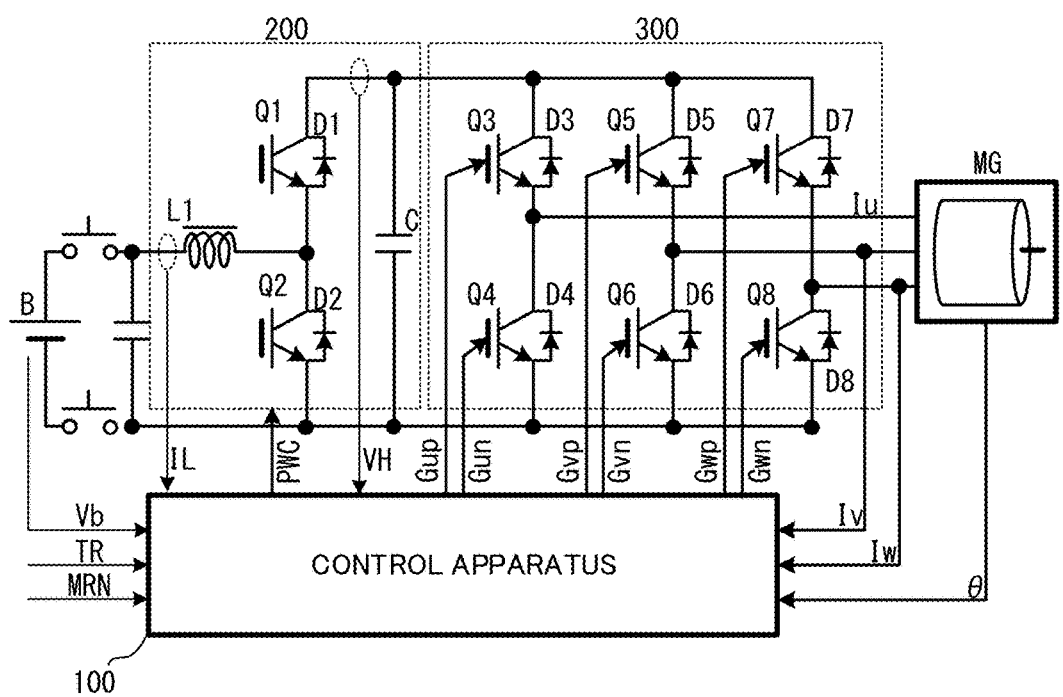

[FIG. 2]
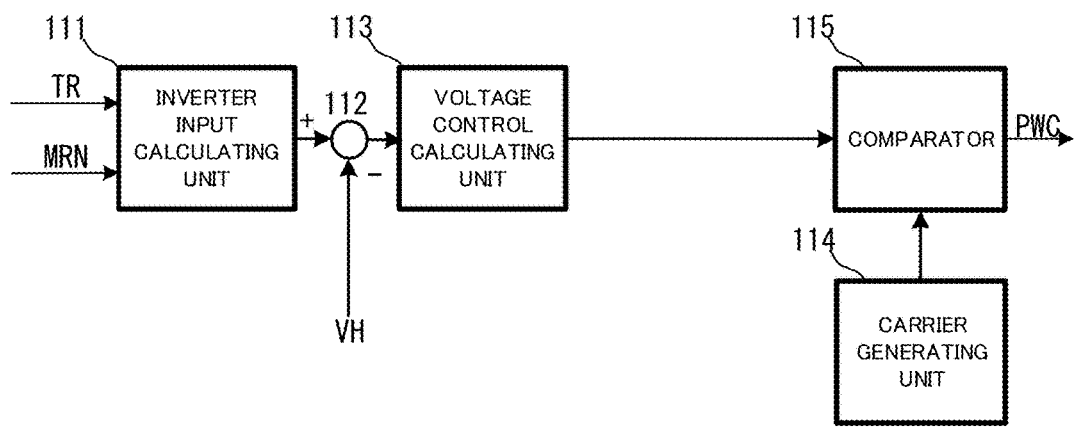
[FIG. 3]
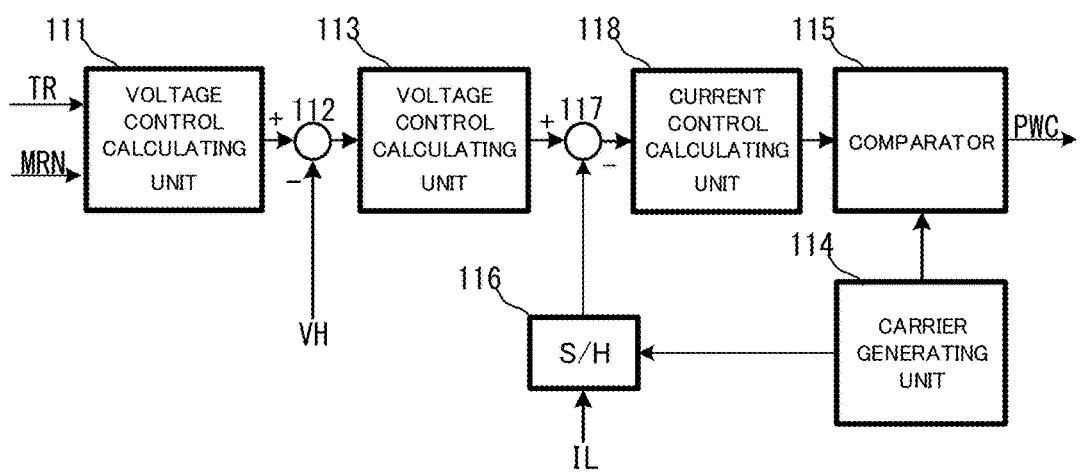

[FIG. 4]
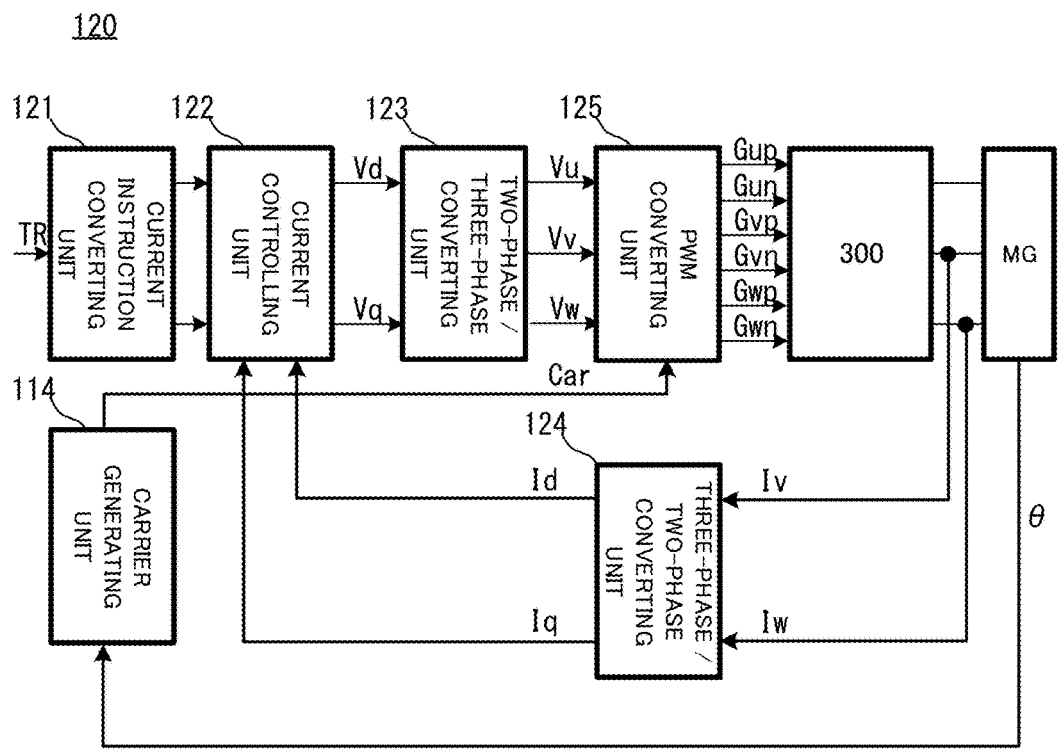

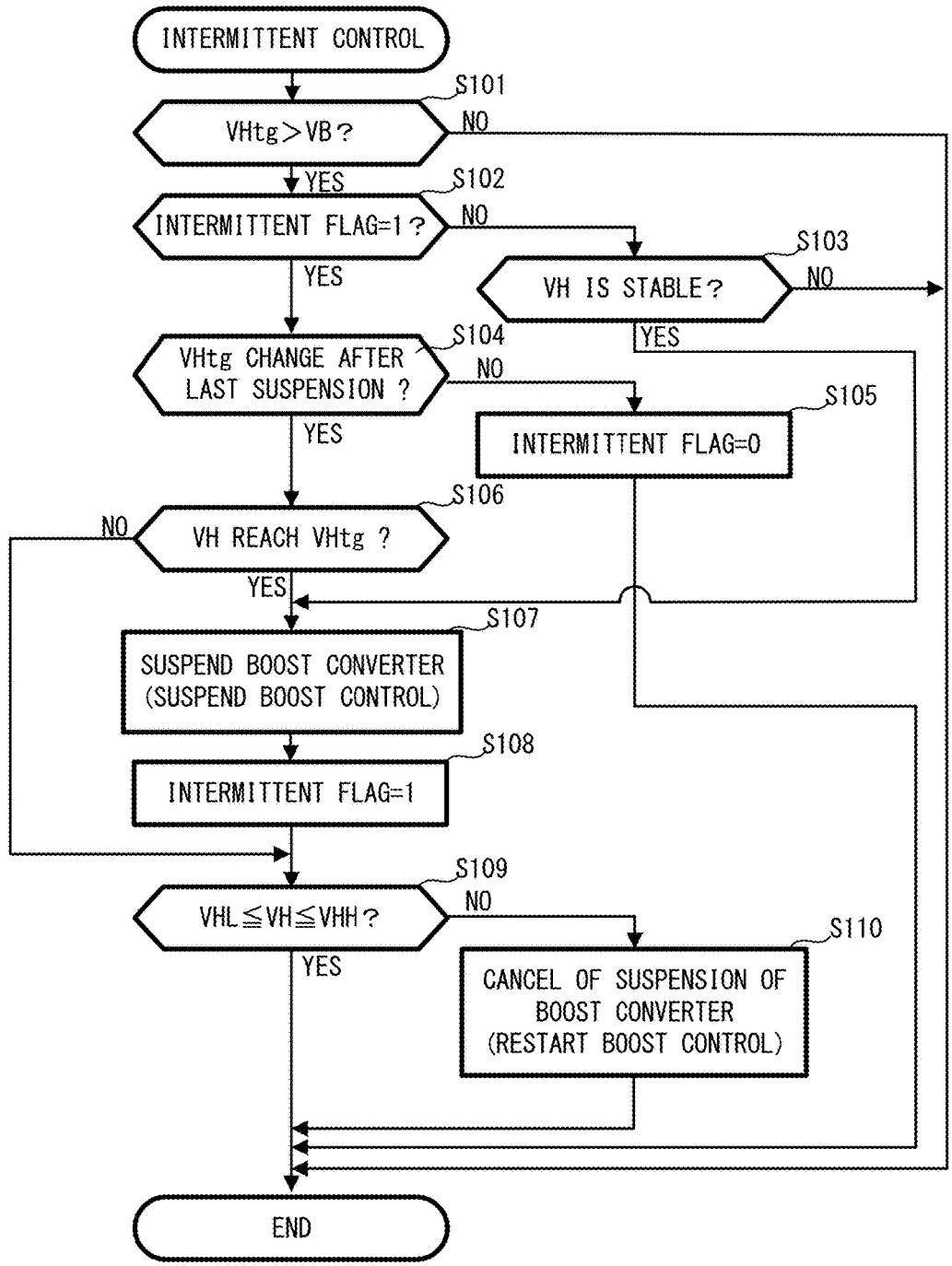
[FIG. 5]

[FIG. 6]
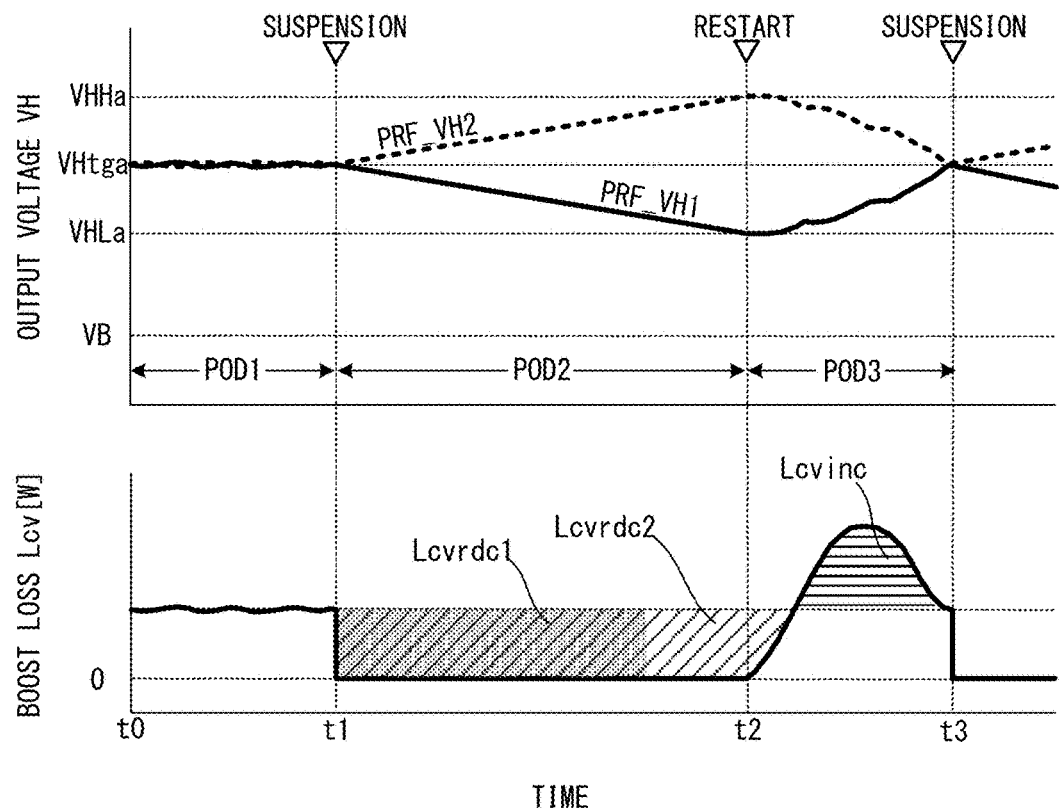
[FIG. 7]
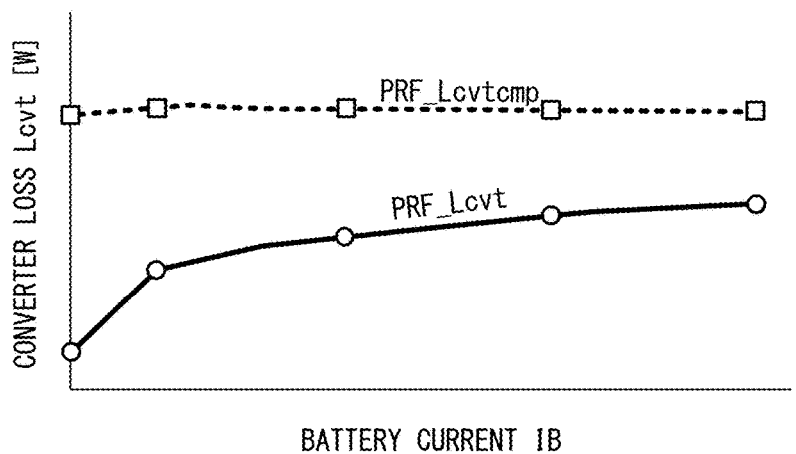

[FIG. 8]
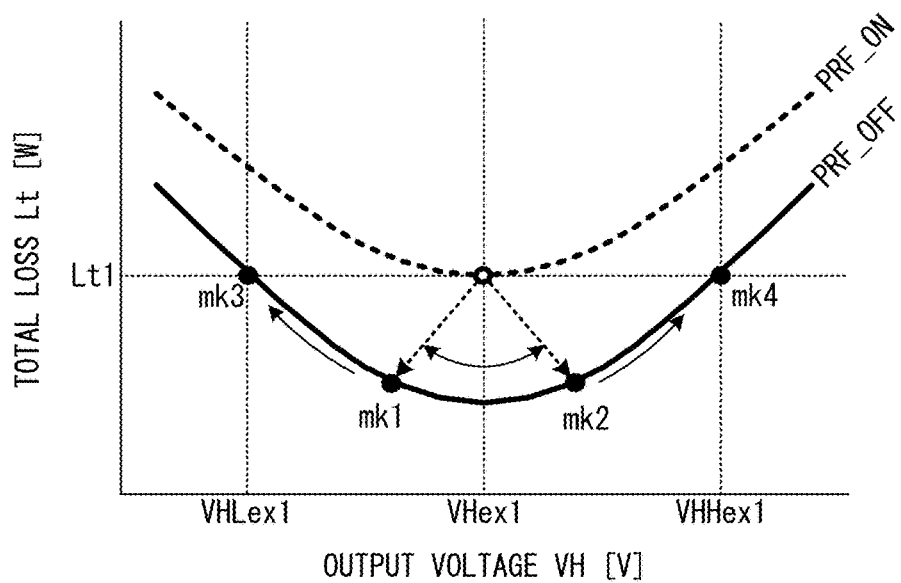
[FIG. 9]
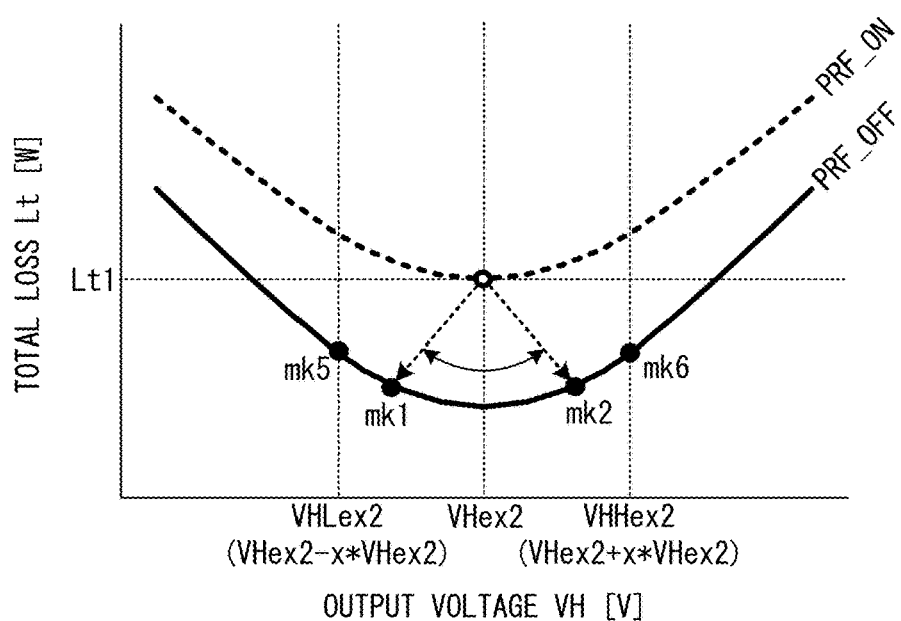

[FIG. 10]
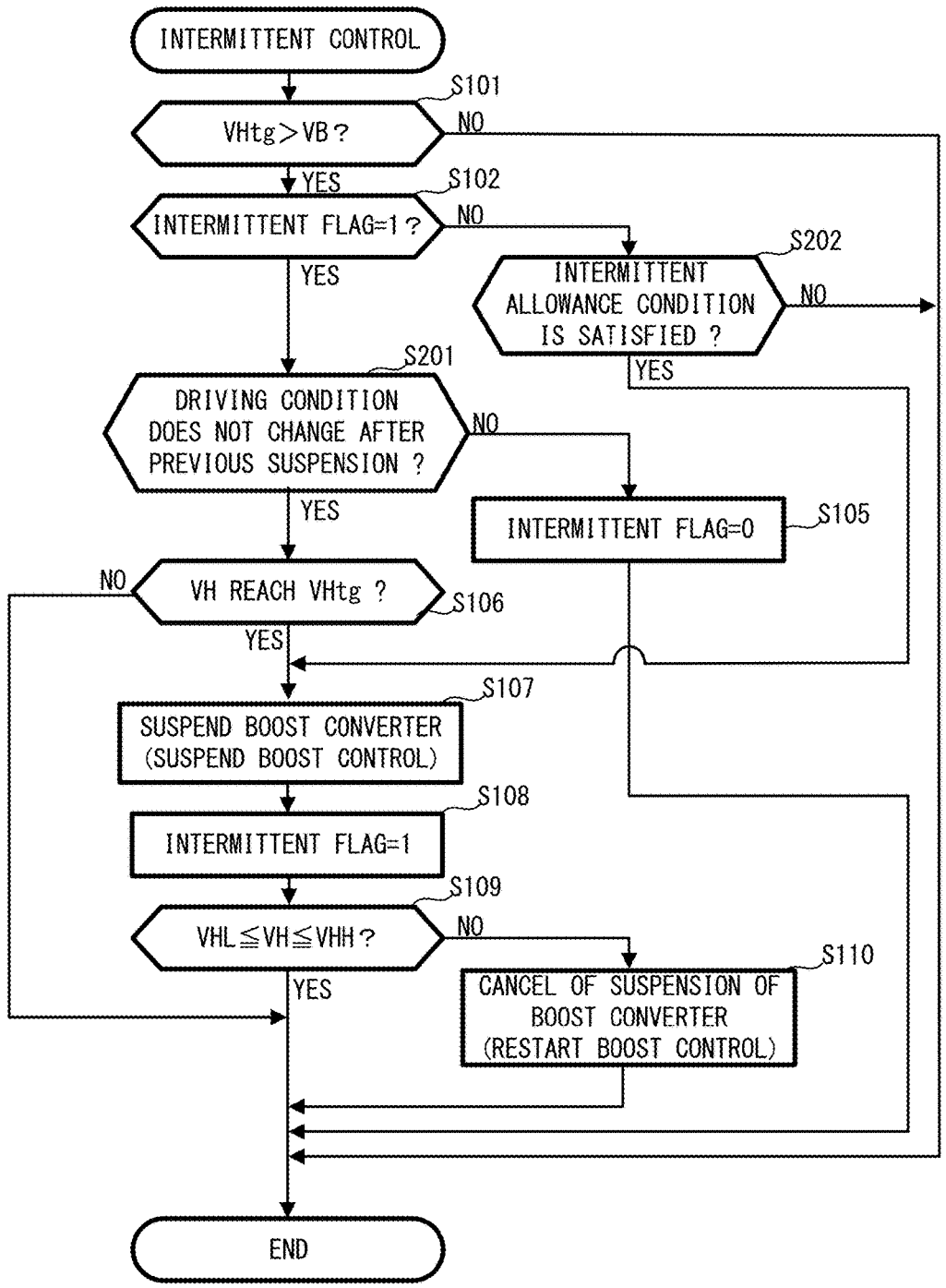

[FIG. 11]
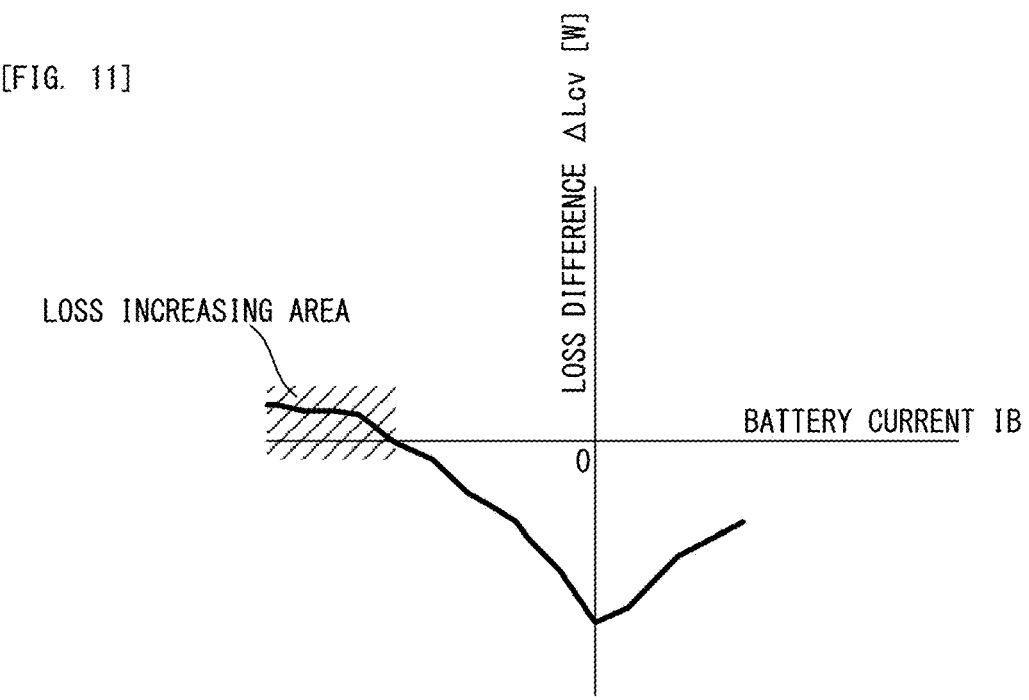
[FIG. 12]
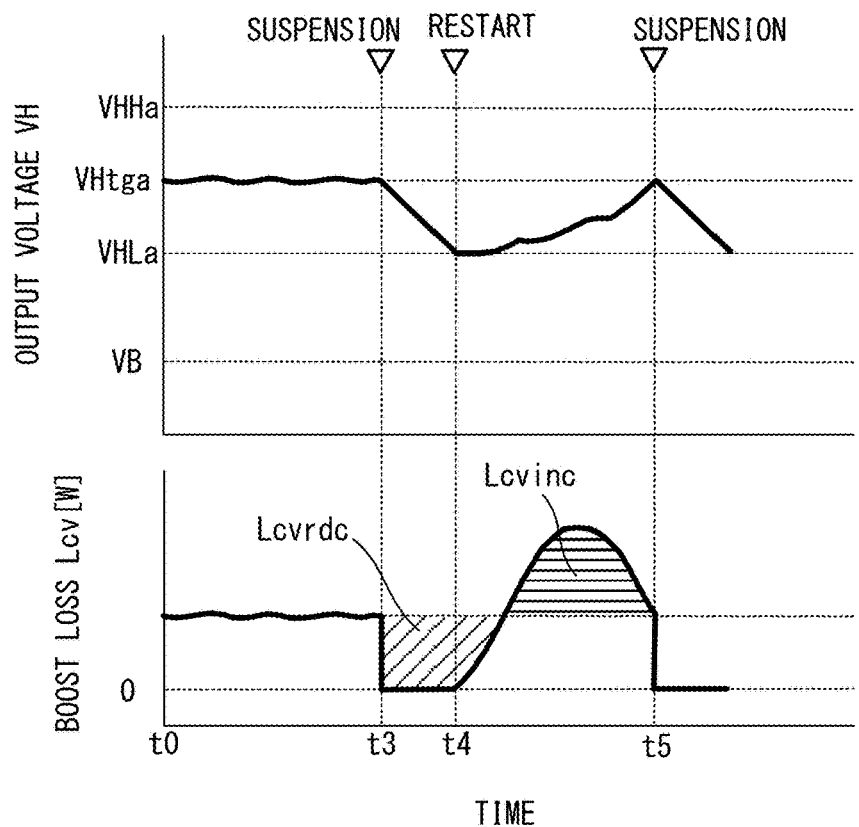

[FIG. 13]
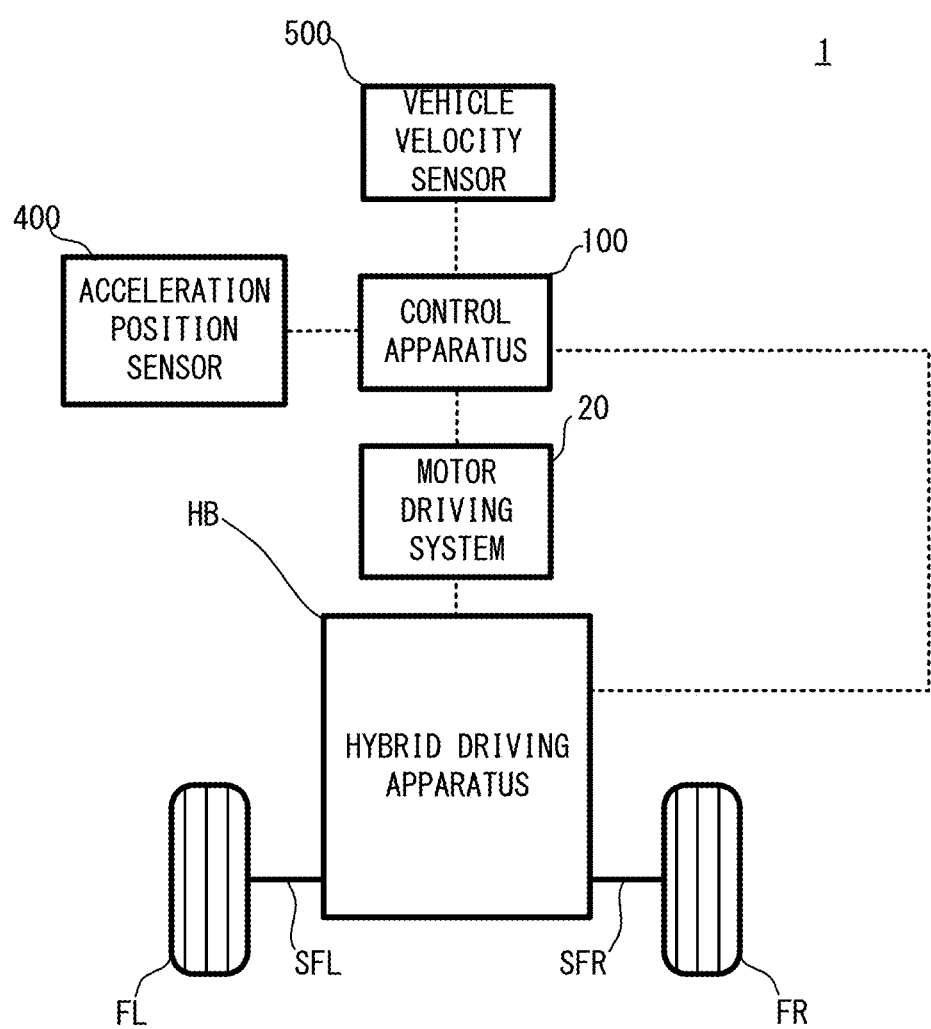

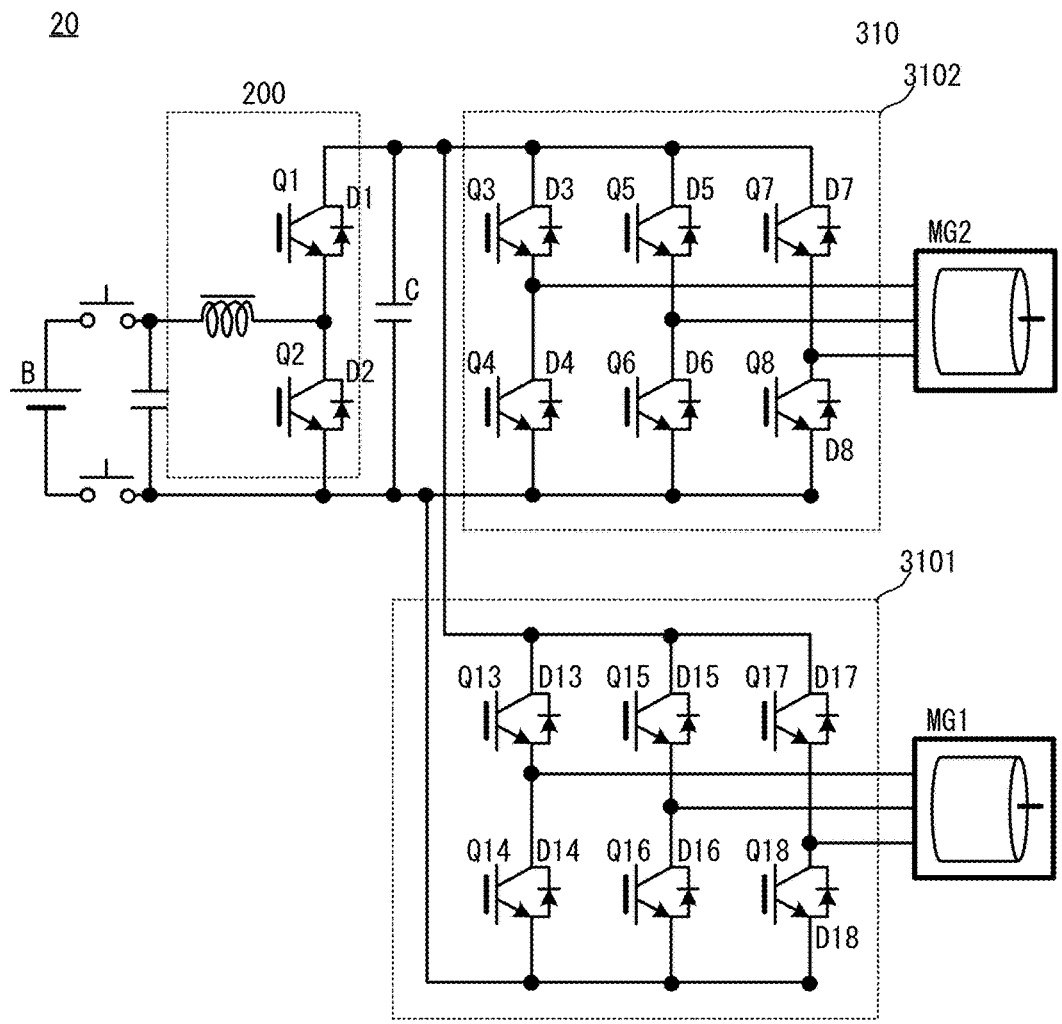
[FIG. 14]

[FIG. 15]
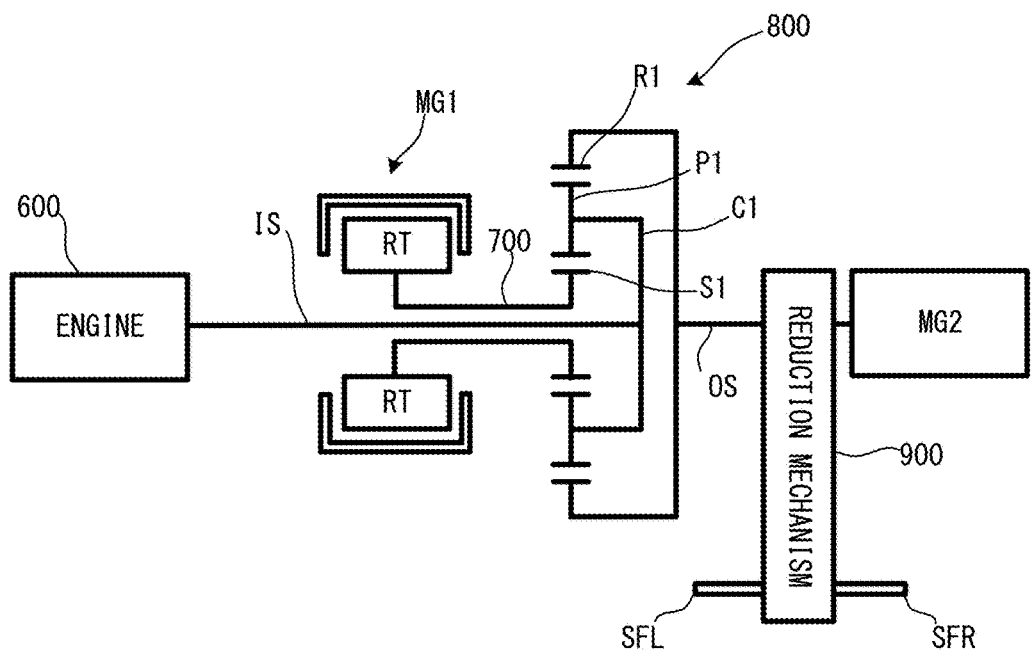
[FIG. 16]
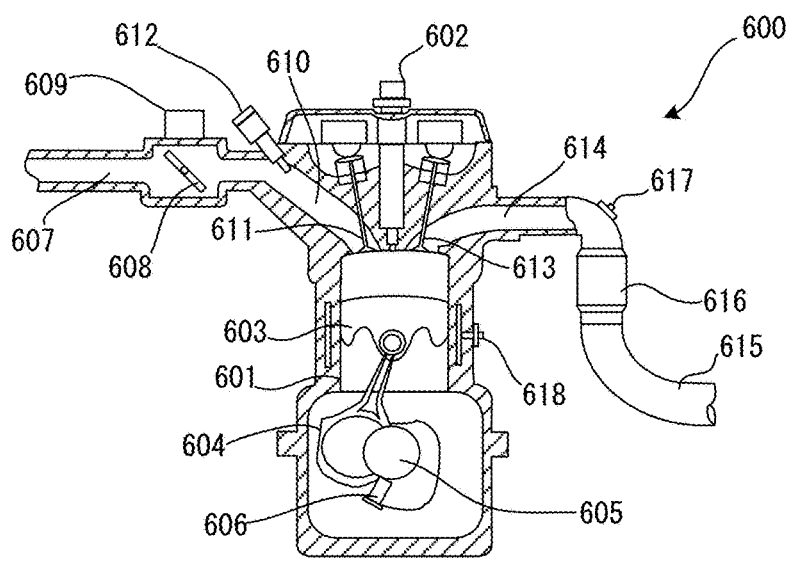

[FIG. 17]
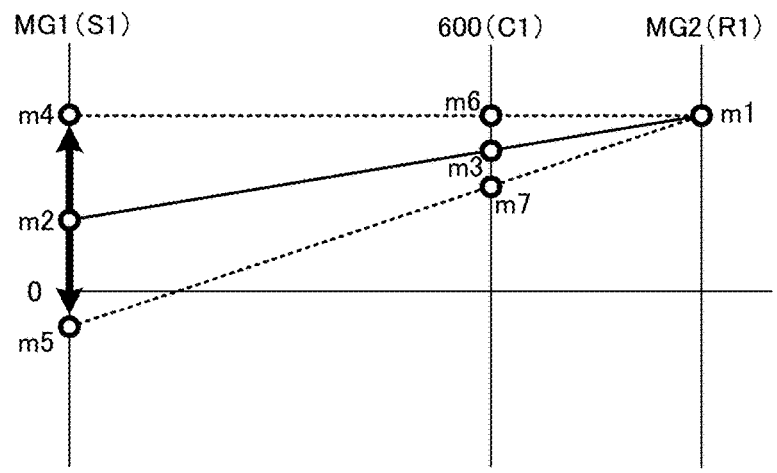
[FIG. 18]
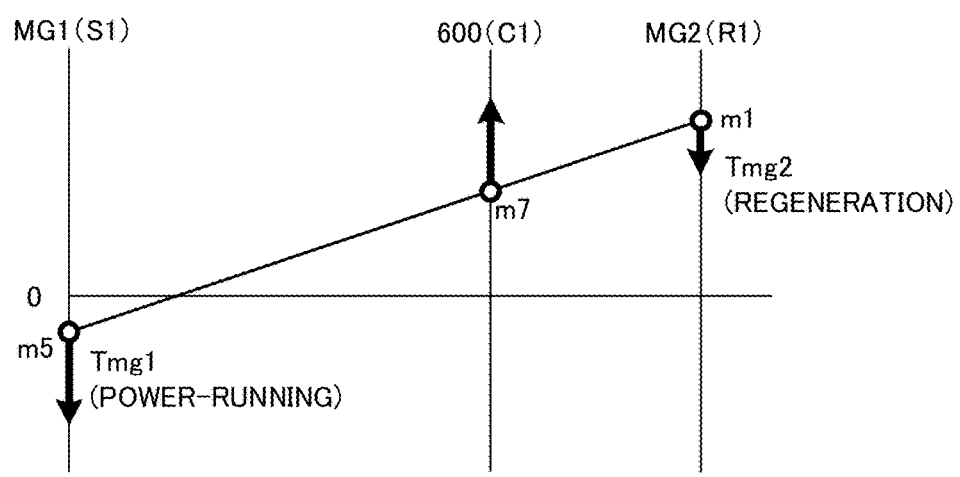

[FIG. 19]
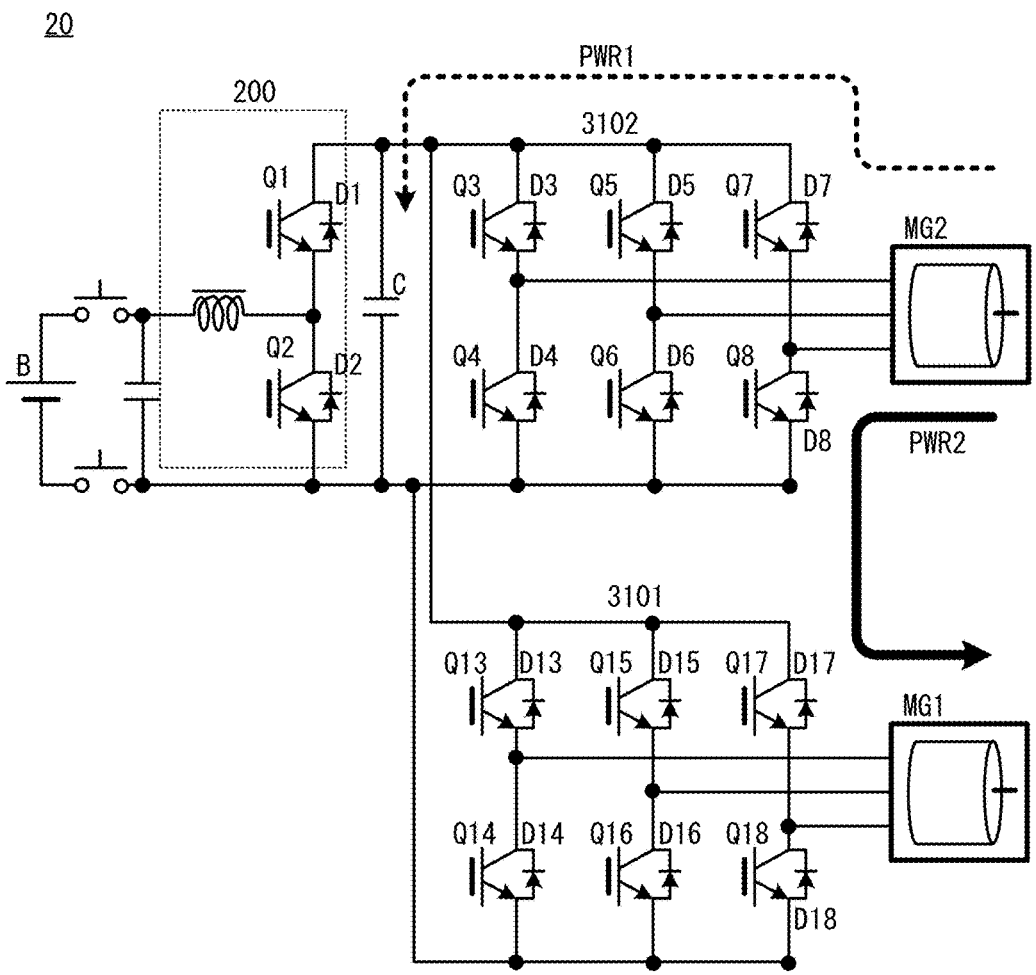

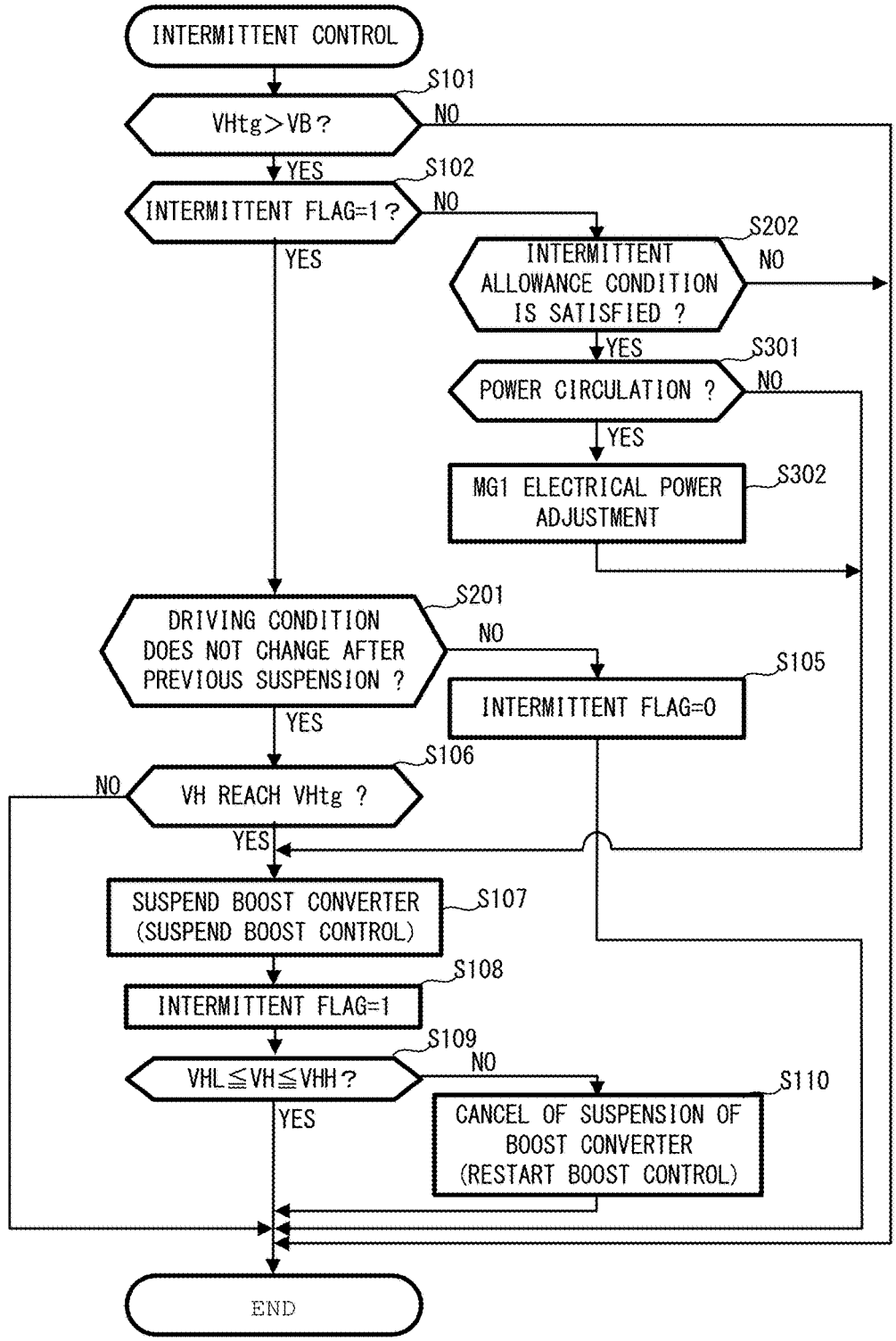

[FIG. 21]
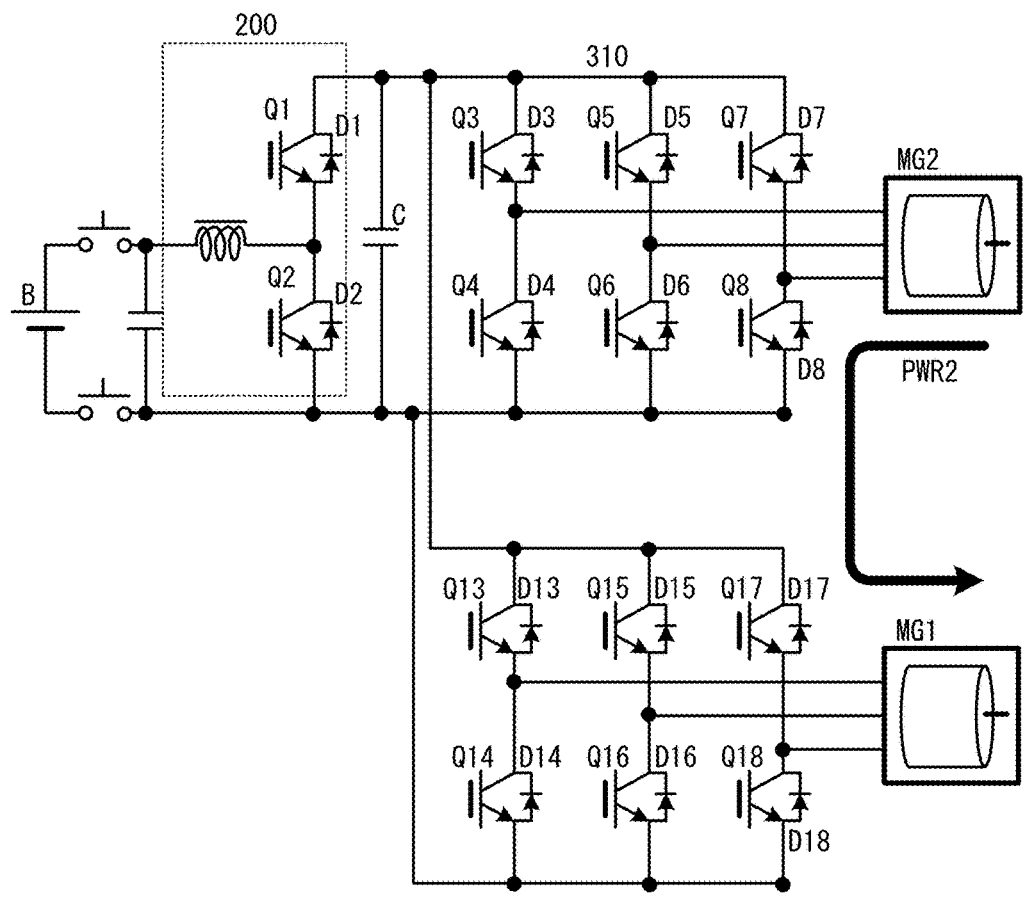

[FIG. 22]
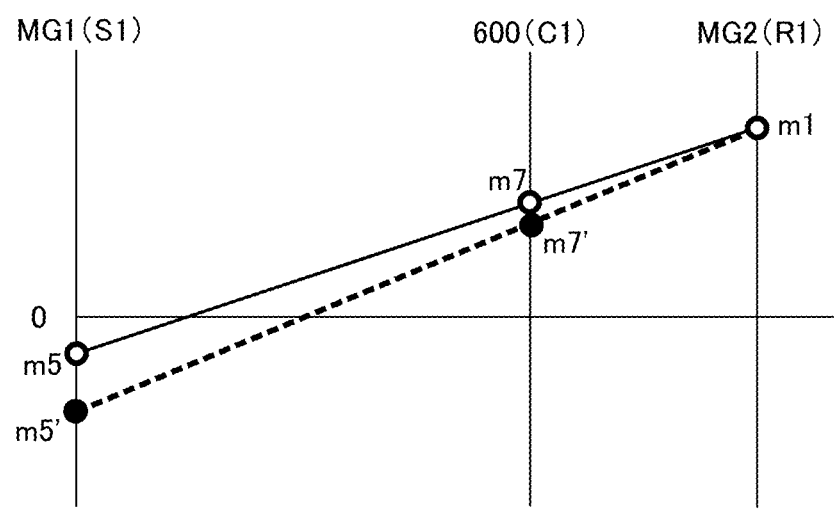

CONTROL APPARATUS FOR BOOST CONVERTER

CROSS-REFERENCE TO RELATED APPLICATION

This is a national phase application based on the PCT International Patent Application No. PCT/JP2012/067613 filed Jul. 10, 2012, the entire contents of which are incorporated herein by reference.

TECHNICAL FIELD

The present invention relates to a technical field of a control apparatus for a boost converter which controls the boost converter in an electric power supply system for a vehicle, for example.

BACKGROUND ART

As such a control apparatus, for example, a Patent Literature 1 discloses a control apparatus for a load driving system which is capable of keeping (maintaining) an output voltage of a boost converter even when an operation of the boost converter is suspended under such a condition that the load is extremely small.

According to this apparatus, a switching operation of the converter is suspended when a total load electrical power, which is a sum of load electrical powers of a plurality of loads, is a value which is within a predetermined range including zero. Moreover, when the total load electrical power is the value which is within the predetermined range, an instruction which is given to any load driving controlling device is corrected such that an absolute value of a deviation between an instructed value and the output voltage of the boost converter decreases. Thus, the output voltage of the boost converter can be kept (maintained) even when the operation of the boost converter is suspended under such a condition that the load is extremely small. Moreover, a loss of the boost converter can be reduced because the operation of the boost converter can be suspended under such a condition that the load is extremely small or zero.

Incidentally, a control apparatus for a load driving system in which a control which is same as the control of the Patent Literature 1 is adapted to a single load is also proposed (see a Patent Literature 2).

CITATION LIST

Patent Literature

Patent Literature 1 Japanese Patent Application Laid Open No. 2011-15603
Patent Literature 2 Japanese Patent Application Laid Open No. 2010-283932

SUMMARY OF INVENTION

Technical Problem

According to the apparatus which is disclosed in each of the Patent Literatures 1 and 2 (hereinafter, it is referred to as a "conventional apparatus"), it is a condition for suspending the boost converter that its output voltage VH ("a secondary voltage" in the Literatures) does not decrease during the boost converter being suspended. Namely, the conventional apparatus is not capable of suspending the boost converter under such a condition that the output voltage VH varies or has to vary. An extremely small variation of the load occurs even under such a condition that the load is regarded as to be generally zero, as disclosed in a paragraph 0005 of the Patent Literature 1, except for such an ideal condition that the load is ideally zero. The conventional apparatus suppresses the variation of the output voltage VH by correcting an instructed torque of a load apparatus to suppress the variation of the load.

By the way, a torque which is required for the load apparatus has no relation to a condition of the boost converter for the reduction of the loss. If an actual output torque of the load apparatus significantly differs from a required value in order to correct the torque which is required for the load apparatus, it is difficult for the load apparatus to function in a originally desired manner. Especially, if a torque which is supplied to a driving shaft being connected to an axle shaft differs from a required torque in the case where the load apparatus is a motor for driving a vehicle, a vehicle performance and a drivability could be significantly influenced. Therefore, the conventional apparatus is not capable of achieving the control itself unless a load area in which the load is extremely small (the total load electrical power is within the predetermine range including zero) as consistently explained in the Literature.

Here, in the load apparatus which is configured to include the motor and a generator, a balance of an input and output of the electrical power can be kept (maintained) by using an electrical power which is generated by the generator for a power running driving of the motor. However, a consumed electrical power of the load has no choice to be predicted on the basis of a voltage value and a current value and thus includes a margin of an error. Therefore, it is not easy to precisely balance the input and output of the electrical power between the motor and the generator, and after all the above described control cannot work adequately unless a small load area in which a prediction accuracy of the electrical power is easy to be relatively high. Moreover, if the above described control is performed in a large load area, an efficiency of whole system including the load apparatus and the boost converter is easy to decrease although the variation of the output voltage of the boost converter can be suppressed. Namely, an actual advantage by the reduction of the loss of the boost converter is likely lost.

The conventional apparatus is not capable of having a benefit from the suspension of the boost converter unless the load apparatus is in the extremely limited condition as described above. Therefore, the advantage is very limited and thus it is difficult to adequately reduce the loss of whole system (hereinafter, it is referred to as a "total loss") including a loss of a boosting operation of the boost converter and a loss which arises when the load apparatus is driven by using the output voltage of the boost converter. Namely, there is such a technical problem in the conventional apparatus that the efficiency of the reduction of the total loss is not adequate.

The present invention is related to the above described technical problem and it is an object of the present invention to provide a control apparatus for the boost converter which is capable of reduce the total loss.

Solution to Problem

In order to solve the above described problem, a control apparatus for a boost converter of the present invention is a control apparatus for a boost converter which controls the boost converter in an electrical power supply system, the electrical power supply system has: a DC electrical power source having a source voltage VB; the boost converter which includes a switching device and which boosts the source voltage VB by a predetermined boost control and outputs the boosted voltage to a load apparatus, the boost control including a change of a switching state of the switching device based on a boost instruction voltage; and a voltage detecting device which detects an output voltage VH of the boost converter, the control apparatus has: a boost controlling device which performs the boost control; and an intermittent controlling device which performs an intermittent process of the boost control based on the detected output voltage VH to keep the output voltage VH within a range including the boost instruction voltage which is used when the last boost control is performed (Claim 1).

According to the control apparatus for the boost converter, the intermittent process of the boost control (hereinafter, it is simply referred to as the "intermittent process" is performed. The intermittent process is a process for repeating a suspension of the boost control and a resuming (namely, a cancellation of the suspension) of the boost control.

A boost operation of the boost converter leads to a boost loss which is caused by a switching ripple of the switching device and the like. The suspension of the boost control is effective for a reduction of the total loss, because the boost loss is zero during a period when the boost control is suspended.

On the other hand, a technical concept to keep (maintain) such a condition that the boost control is suspended as much as possible, instead of allowing the boost control to be performed in an intermittent manner, is conventionally well-know, as explained in the explanation about the above described conventional apparatus. Namely, in this case, the output voltage VH, which originally and naturally varies depending on a driving condition of the load apparatus when the boost converter is in a suspended condition, does not vary by a correction of the driving condition of the load apparatus. Also in this technical concept, same argument relating to the suspension of the boost control of the boost converter can be applied.

However, the technical concept to perform a certain measurement only at the load apparatus side while not allowing the variation of the output voltage VH, in other word, the technical concept in which the suspension of the boost control has an unambiguous relationship with the non-variation of the output voltage VH of the boost converter is unnatural and irrational. Because, there is nothing to suspend the boost control at only a extremely limited load area in which the output voltage VH does not originally vary or to ignore a load (for example, a driving torque by which the vehicle, on which the electrical power supply system is mounted, is driven) which is required for the load apparatus, in order not to allow the output voltage VH to vary against a natural process in which an electrical energy stored in the boost converter increases when the load apparatus is in an electrical power regeneration state and the electrical energy decreases when the load apparatus is in the power-running state. Therefore, the technical concept of the conventional apparatus is not capable of adequately reducing the total loss.

On the other hand, the intermittent process which is performed by the control apparatus for the boost converter of the present invention is a process of suspending the boost control which is performed while allowing the output voltage VH to vary within the range which is set in advance or the range which is individually set accordingly on the basis of a setting rule which is set in advance.

Here, the intermittent process is performed on the basis of the output voltage VH of the boost converter which is detected by the detecting device. Namely, the control apparatus for the boost converter of the present invention technically presupposes the usage of the boost converter as a certain type of an electrical power control apparatus, because it is found that an operation state of the boost converter can be used as a controlled element under the background in which a switching performance (for example, a switching frequency) of the switching device significantly improves recently.

When the control apparatus of the boost converter of the present invention is used, the boost control can be suspended without any problem under a load condition at which it is difficult to perform the certain measurement at the load apparatus side, and a frequency of the suspension of the boost control is evidently higher and a sum of periods at each of which the boost control is suspended evidently larger than those in the case where the conventional apparatus is used. Therefore, the control apparatus for the boost converter of the present invention is capable of reducing the total loss more.

Incidentally, the suspension of the boost control in the intermittent process means not the suspension of the operation of each switching element constituting the switching device which occurs in the boost control but the suspension of a boost operation itself of the boost converter, namely, shutdown. In a general control of this type of the boost converter, the switching state of the switching element changes every time a carrier signal which is a triangle wave becomes to be same as a duty signal which corresponds to the boost instruction voltage. Here, when one switching element constitutes the switching device (for example, a boost converter of single arm type and the like corresponds to this one), although the switching device can be regarded to be in a suspended condition at the timing when the switching from ON to OFF is performed, this suspended condition is merely a suspended condition which necessarily occurs as one portion of the boost control and its meaning is different from the meaning of the suspension of the boost converter in the present invention.

In one aspect of the control apparatus for the boost converter of the present invention, the control apparatus for the boost converter further has a setting device which sets the range on the basis of at least one of the source voltage VB, a withstand voltage of the boost converter, the boost instruction voltage and a loss which arises when the load apparatus is driven (Claim 2).

According to this aspect, the setting device sets the range within which the output voltage VH is to be kept (maintained). Therefore, the variation of the output voltage VH can be kept (maintained) within an appropriate range and the reduction of the total loss can be realized effectively. Incidentally, the range which is set by the setting device includes following ranges (1) to (6).

(1) a range which is a high voltage side than the source voltage VB;

(2) a range which is a low voltage side than the withstand voltage of the boost converter;

(3) a range whose deviation from the boost instruction voltage is within a predetermined value;

(4) a range whose percentage to the boost instruction voltage is within a predetermined percentage;

(5) a range at which an increasing amount of the loss which arises when the load apparatus is driven, compared to the boost instruction voltage, is within a predetermined value; and (6) a range at which an increasing amount of the loss which arises when the load apparatus is driven, compared to the boost instruction voltage, is within a predetermined percentage.

Incidentally, the above described (5) and (6) presuppose the setting of the boost instruction voltage to a voltage value which is appropriate for the driving of the load apparatus (namely, by which the loss is minimum) depending on the driving condition of the load apparatus. On the premise of the above described appropriate value, although the loss which arises when the load apparatus is driven increases at both of the high voltage side and the low voltage side than the boost instruction voltage, its increasing amount is not large in the vicinity of the boost instruction voltage (namely, the variation is mild). Therefore, the range at which a reduction amount of the loss due to the suspension of the boost control of the boost converter exceeds an increasing amount of the loss when the load is driven, namely, the range by which the total loss can be reduced can be set in advance, experimentally, experientially or theoretically.

In another aspect of the control apparatus for the boost converter of the present invention, the intermittent controlling device resumes the boost control when the output voltage VH exceeds a boundary value of the range in performing the intermittent process of the boost control (Claim 3).

According to this aspect, the output voltage VH of the boost converter can be kept (maintained) within the range within which the output voltage VH is to be kept (maintained). Incidentally, the boundary value of the range means an upper limiting value which is used in the electrical power regeneration state and the lower limiting value which is used in the power-running state.

In another aspect of the control apparatus for the boost converter of the present invention, the intermittent controlling device varies the output voltage VH between the boost instruction voltage and the boundary value of the range in performing the intermittent process of the boost control (Claim 4).

According to this aspect, the output voltage VH of the boost converter varies between the boost instruction voltage and the boundary value. Therefore, a hunting which could be caused when only the boundary value is used as a judgment parameter can be prevented and the output voltage VH can be prompted to quickly return to the boost instruction voltage at a desired timing.

Incidentally, the boost instruction voltage which defines a range of the variation of the output voltage VH in this aspect may not be a strict boost instruction voltage which is used when the last boost control is performed, and may has a margin including a conversion error which may constantly occur when the output voltage VH is converged to the boost instruction voltage at the last boost control.

In another aspect of the control apparatus for the boost converter of the present invention, the intermittent controlling device starts the intermittent process of the boost control when a range of a variation of the output voltage VH is within a predetermine value (Claim 5).

According to this aspect, the intermittent process is allowed when the range of the variation of the output voltage VH is within the predetermined value. The range of the variation of the output voltage VH means a concept including a quantitative index of the variation of the output voltage VH in a certain period, and its definition is not unambiguous. For example, the range of the variation of the output voltage VH may be an average value of a deviation between the boost instruction voltage and the output voltage VH during a certain period. Alternatively, the range of the variation of the output voltage VH may be a maximum value of a deviation between the boost instruction voltage and the output voltage VH during a certain period. Alternatively, the range of the variation of the output voltage VH may be a maximum value of a variation amount of the output voltage VH during a certain period.

According to this aspect, the total loss is predicted to be effectively reduced, because the intermittent process is allowed to be performed when the output voltage VH is stabilized under such a condition that the boost instruction voltage is constant. Moreover, when the boost instruction voltage varies, the output voltage VH whose target value is the boost instruction voltage also varies and thus the range of the variation becomes large after all. Namely, the intermittent process can be easily prohibited to be performed depending on the setting aspect of the predetermined value and thus the total loss is effectively reduced.

In another aspect of the control apparatus for the boost converter of the present invention, the electrical power supply system further has a current detecting device which detects a current flowing in the boost converter or the DC electrical power source, the intermittent controlling device starts the intermittent process of the boost control when the detected current is within a predetermined value (Claim 6).

When an absolute value of the current (incidentally, it may be a positive value or a negative value depending on the driving condition of the load apparatus) flowing in the boost converter or the DC electrical power source is large, the output voltage VH varies relatively rapidly due to the suspension of the boost control. Therefore, when the above described range is constant, the output voltage VH depends on the boundary value of the range in a relatively short period of time and the boost control is resumed. When the period at which the boost control is suspended is short as described above, an increasing amount of the boost loss at a period from the resuming of the boost control to the re-suspension of the boost control may be larger than an reducing amount of the boost loss due to the suspension of the boost control in some cases, and thus the effect of the reduction of the total loss due to the intermittent process cannot be obtained.

According to this aspect, the intermittent process starts when the detected current is within the predetermined value, in other words, the intermittent process is not allowed to be performed when the detected current is larger than the predetermined value, and thus the total loss can be certainly reduced.

In another aspect of the control apparatus for the boost converter of the present invention, the control apparatus for the boost converter further has an output variation specifying device which specifies a degree of an variation of an output of the DC electrical power source or the load apparatus, the intermittent controlling device starts the intermittent process of the boost control when the specified degree of the variation of the output is within a predetermined value (Claim 7).

When the degree of the variation of the output of the DC electrical power supply or the load apparatus is large, the output voltage VH varies relatively rapidly due to the suspension of the boost control. Therefore, when the above described range is constant, the output voltage VH is converged to the boundary value of the range in a relatively short period of time and the boost control is resumed. When the period at which the boost control is suspended is short as described above, an increasing amount of the boost loss at a period from the resuming of the boost control to the re-suspension of the boost control may be larger than an reducing amount of the boost loss due to the suspension of the boost control in some cases, and thus the effect of the reduction of the total loss due to the intermittent process cannot be obtained.

According to this aspect, the intermittent process starts when the detected degree of the variation of the output is within the predetermined value, in other words, the intermittent process is not allowed to be performed when the detected degree of the variation of the output is larger than the predetermined value, and thus the total loss can be certainly reduced.

Incidentally, in an aspect in which the electrical power supply system is mounted on the vehicle and used for driving the load apparatus which is mounted on the vehicle, the case where the degree of the variation of the output is larger than the predetermined value corresponds to a driving condition such as a rapid acceleration, a slip and the like.

In another aspect of the control apparatus for the boost converter of the present invention, the electrical power supply system is mounted on a vehicle (Claim 8).

The vehicle is an appropriate target for adapting the electrical power supply system of the present invention.

In another aspect of the control apparatus for the boost converter of the present invention which presuppose the mounting on the vehicle, the vehicle has at least one rotating electrical machine, as a driving power source of the vehicle, which is the load apparatus and which is capable of performing a power-running and a regeneration (Claim 9).

According to this aspect, the load apparatus has at least one rotating electrical machine for driving the vehicle. Moreover, especially, the rotating electrical machine constitutes a motor generator which is capable of performing the power-running and the regeneration. Namely, according to this aspect, the vehicle is a hybrid vehicle or an EV (Electrical Vehicle), what we call. In this type of the vehicle, a necessity of the reduction of the electrical power is high and thus the practical advantage which is realized by the control apparatus for the boost converter of the present invention is large.

In another aspect of the control apparatus for the boost converter of the present invention in which the vehicle has at least one rotating electrical machine, the vehicle is a hybrid vehicle which has: an engine; a first rotating electrical machine which is the load apparatus and which is capable of performing a power-running and a regeneration; a differential mechanism having a plurality of rotating elements, the plurality of rotating elements are capable of differentially rotating and include a first rotating element which is connected to the first rotating electrical machine, a second rotating element which is connected to the engine and a third rotating element which is connected to a driving shaft being connected to an axle shaft; and a second rotating electrical machine which is connected to the driving shaft, which is the load apparatus and which is capable of performing the power-running and the regeneration, the intermittent controlling device starts the intermittent process of the boost control when a difference between an input and output of the electrical power of the first and second rotating electrical machines is within a predetermine value in the case where one of the first and second rotating electrical machines is in a power-running state and the other one of the first and second rotating electrical machines is in a regeneration state (Claim 10).

According to this aspect, the vehicle constitutes a hybrid vehicle in which a driving power is distributed (a torque is distributed) among the engine and the rotating electrical machines by the differential mechanism having the rotating elements which are capable of differentially rotating. In this type of the hybrid vehicle, the rotating electrical machine which is a reaction force element for applying a reaction force to the engine, the rotating electrical machine which is a driving element for inputting/outputting the torque to/from the driving shaft and the engine supply the necessary torque to the driving shaft while they cooperate with each other.

Here, in this type of the hybrid vehicle, when the vehicle moves under such a condition that a velocity is high and the load is small and the like for example, the first rotating electrical machine which is the reaction element is sometimes in the power-running state and the second rotating electrical machine which is the driving force is sometimes in the regeneration state. Under such a special condition, the electrical power is transmitted between the first and second rotating electrical machines, and thus the difference between the input and output of the electrical power of the first and second rotating electrical machines is close to zero, considering an input and output loss related to the transmittance of the electrical power. Therefore, when the intermittent process is performed under the above described special condition, the output voltage VH varies gently during a period during which the boost converter is suspended, and thus the period during which the boost converter is suspended can be long adequately.

In another aspect of the control apparatus for the boost converter of the present invention in which the intermittent process of the boost control is performed when the difference between the input and output of the electrical power is within the predetermined value, the control apparatus for the boost converter further has an electrical power input/output controlling device which controls the first and second rotating electrical machines and the engine to balance the input and output of the electrical power, when the start of the intermittent process of the boost control is subject to the difference between the input and output of the electrical power being within the predetermine value (claim 11).

According to this aspect, under such an above described condition that the input and the output of the electrical power are balanced, the electrical power input/output controlling device controls the first and second rotating electrical machines and the engine to balance the input and output of the electrical power. Namely, the input and output of the electrical power are controlled to be in a more perfect balanced state by using the fact that the input and output are almost balanced under the above described condition. Therefore, it is possible to suspend the boost converter permanently, ideally, as long as the above described condition persists.

In another aspect of the control apparatus for the boost converter of the present invention which has the electrical power input/output controlling device, the electrical power input/output controlling device changes an operation point of the engine by changing a rotational number of the first rotating electrical machine in balancing the input and output of the electrical power (Claim 12).

In this type of the hybrid vehicle, the first rotating electrical machine applies the reaction force to the engine as the reaction force element, as described above. On the other hand, the second rotating electrical machine is connected to the driving shaft and thus its rotational number depends on a velocity of the vehicle. Therefore, it is valid to adjust an operation state of the first rotating electrical machine when the input and output of the electrical power are balanced by the electrical power input/output controlling device. On the other hand, the rotational number of the first rotating electrical machine is likely small under such a condition that the input and output of the electrical power of the first and second rotating electrical machines are almost balanced. The electrical power is the output of the rotating electrical machine, and is a product of the rotational number and the torque if the detailed calculation is abbreviated. Thus, when the input and output of the electrical power are adjusted by the adjustment of the operation state of the first rotating electrical machine, a variation of the torque of the first rotating electrical machine is inevitably large. The variation of the torque of the first rotating electrical machine causes the increasing of the rotational number of the engine, and thus the adjustment which is performed by the electrical power input/output controlling device is easy to give an uncomfortable feeling to a driver.

According to this aspect, the rotational number of the first rotating electrical machine can be changed when the electrical power input/output adjusting device adjusts the input and output of the electrical power, and thus it is possible to change the operation point of the engine to an appropriate operation point by which the uncomfortable feeling can be reduced. Therefore, it is possible to balance the input and output of the electrical power more appropriately.

Incidentally, in this aspect, the electrical power input/output controlling device may change the operation point of the engine under such a condition that a reduction amount of a loss due to the intermittent process of the boost control exceeds an increasing amount of a loss due to the change of the operation point of the engine (Claim 13).

On the other hand, when the operation point of the engine is changed as described above, a heat efficiency of the engine may decrease. According to this aspect, the operation point is allowed to be changed under such a condition that the reduction amount of the loss due to the intermittent process exceeds the increasing amount of the loss due to the change of the operation point of the engine. Therefore, it is possible to suppress a reduction of the drivability under such a condition that the basic effect of the present invention is not prevented.

The operation and other advantages of the present invention will become more apparent from embodiments explained below.

BRIEF DESCRIPTION OF DRAWINGS

FIG. 1 is a system structure diagram which conceptually illustrates a structure of a motor driving system of a first embodiment of the present invention.

FIG. 2 is a block diagram of a boost controlling unit in the control apparatus of the motor driving system in FIG. 1.

FIG. 3 is a block diagram of another boost controlling unit in the control apparatus of the motor driving system in FIG. 1.

FIG. 4 is a block diagram of an inverter controlling unit in the control apparatus of the motor driving system in FIG. 1.

FIG. 5 is a flowchart of the intermittent control in the motor driving system in FIG. 1.

FIG. 6 is a timing chart which illustrates one example of a temporal transition of the output voltage VH of the boost converter and the boost loss Lcv during a period when the intermittent control illustrated in FIG. 5 is performed.

FIG. 7 is a diagram which illustrates one example of a relationship between a converter loss Lcvt and the battery current IB when the intermittent control illustrated in FIG. 5 is performed.

FIG. 8 is a diagram for explaining one aspect of setting an upper and lower limiting values, which are used by the intermittent control illustrated in FIG. 5, of the output voltage VH of the boost converter.

FIG. 9 is a diagram for explaining another aspect of setting an upper and lower limiting values of the output voltage VH of the boost converter during a period when the intermittent control illustrated in FIG. 5 is performed.

FIG. 10 is a flowchart of the intermittent control in the second embodiment of the present invention.

FIG. 11 is a diagram which illustrates one example of a characteristics of a loss difference $\Delta Lcv$ of the boost converter to the battery current IB.

FIG. 12 is a timing chart which illustrates one example of another temporal transition of the output voltage VH of the boost converter and the boost loss Lcv during a period when the intermittent control is performed.

FIG. 13 is a conceptual structure diagram which conceptually illustrates a structure of a hybrid vehicle in the fourth embodiment of the present invention.

FIG. 14 is a system structure diagram which conceptually illustrates a structure of a motor driving system of the hybrid vehicle in FIG. 13.

FIG. 15 is a conceptual structure diagram which conceptually illustrates a structure of the hybrid driving apparatus of the hybrid vehicle in FIG. 13.

FIG. 16 is a conceptual cross-sectional diagram which conceptually illustrates the structure of the engine of the hybrid driving apparatus in FIG. 15.

FIG. 17 is an operational alignment chart of the hybrid driving apparatus in FIG. 15.

FIG. 18 is an operational alignment chart when the power circulation of the hybrid driving apparatus in FIG. 15 arises.

FIG. 19 is a diagram which explains an electrical path when the power circulation arises in the motor driving system in FIG. 14.

FIG. 20 is a flowchart of the intermittent control in a fifth embodiment of the present invention.

FIG. 21 is another drawing which illustrates the electrical path when the power circulation arises in the motor driving system in FIG. 14, which is related to an effect of the fifth embodiment.

FIG. 22 is an operational alignment chart for explaining an electrical power adjusting process in a sixth embodiment.

DESCRIPTION OF EMBODIMENTS

Embodiments of Invention

Hereinafter, various embodiments of the present invention will be explained with reference to the drawings.

First Embodiment

Structure of Embodiment

Firstly, with reference to FIG. 1, a structure of a motor driving system 10 of the present embodiment will be explained. FIG. 1 is a system structure diagram which conceptually illustrates the structure of the motor driving system 10.

In FIG. 1, the motor driving system 10 is one example of the "electrical power supply system" of the present invention which is mounted on a not-illustrated vehicle, which has: a control apparatus 100; a boost converter 200; an inverter 300; and a DC (Direct Current) electrical power source B and which is configured to drive a motor generator MG that is the load apparatus being a driving power source of the vehicle.

The control apparatus 100 is an electrical controlling unit which is one example of the "control apparatus for the boost converter" of the present invention which is configured to control an operation of the motor driving system 10. The control apparatus 100 is some type of an electrical control apparatus such as an ECU (Electronic Controlled Unit) or the like, some type of a controller, or a computer system whose form may be a microcomputer apparatus or the like, for example. The control apparatus 100 has a boost controlling unit 110 and an inverter controlling unit 120 which are not illustrated in FIG. 1, however, a structure of each controlling unit will be explained later. Moreover, the control apparatus 100 has a storage apparatus such as a ROM (Read Only Memory), a RAM (Random Access Memory) and the lie, and is configured to be capable of performing an intermittent control, which will be explained later, in accordance with a control program which is stored in the ROM in advance.

The DC electrical power source B is a source voltage VB (for example, 200 volt) of a secondary battery unit in which a plurality of (for example, a few hundred of) some type of secondary batter cells (for example, cell voltage number V), such as nickel-hydrogen batteries, lithium-ion batteries or the like, are connected in series. Incidentally, an electrical double layer capacitor, large capacitance of a condenser, a flywheel or the like may be used as the DC electrical power source, in addition to or instead of this type of the secondary battery.

The boost converter 200 is a boost circuit which is one example of the "boost converter" of the present invention and which has a reactor L1, switching elements Q1 and Q2, diodes D1 and D2 and a capacitor C.

In the boost converter 200, one terminal of the reactor L1 is connected to a positive line (its reference sign is omitted) which is connected to a positive terminal of the DC electrical power source B, and the other terminal is connected to an intermediate point between the switching element Q1 and the switching element Q2, namely a point at which an emitter terminal of the switching element Q1 and a collector terminal of the switching element Q2 are connected.

The switching elements Q1 and Q2 are one example of the "switching devices" of the present invention which are connected in series between the above described positive line and a negative line (its reference sign is omitted) which is connected to a negative terminal of the DC electrical power source B. A collector terminal of the switching element Q1 is connected to the above described positive line and an emitter terminal of the switching element Q2 is connected to the above described negative line. The diodes D1 and D2 are rectifier elements each of which allows current to flow only from the emitter side to the collector side in respective one switching element.

Incidentally, in the present embodiment, the switching elements have the switching element Q1 which is located at a higher potential side than a point to which the terminal of the reactor L1 is connected and the switching element Q2 which is located at a lower potential side than that point, and constitutes a double arms type of boost converter. However, this structure of the boost converter is one example and the boost converter may be a single arm type of boost converter which has only switching element Q2 in FIG. 1.

The switching elements Q1 and Q2 and switching elements (Q3 to Q8) in the below described inverter 300 are configured as IGBTs (Insulated Gate Bipolar Transistors), MOS (Metal Oxide Semiconductor) transistors for the electrical power, or the like.

The capacitor C is a condenser which is connected between the positive line and the negative line. A voltage between terminals of the capacitor C, namely a potential difference VH between the positive line and the negative line is an output voltage of the boost converter 200. Incidentally, hereinafter, an output voltage VH of the capacitor C is referred to as an "output voltage VH".

The inverter 300 is an electrical power converter which has a U-phase arm (its reference sign is omitted) including a p-side switching element Q3 and a n-side switching element Q4, a V-phase arm (its reference sign is omitted) including a p-side switching element Q5 and a n-side switching element Q6 and a W-phase arm (its reference sign is omitted) including a p-side switching element Q7 and a n-side switching element Q8. Arms of the inverter 300 are connected in parallel between the above described positive line and the above described negative line.

Incidentally, rectifying diodes D3 to D8, which allows current to flow from the emitter side to the collector side, are connected to the switching element Q3 to Q8, respectively, as with the switching elements Q1 and Q2. Moreover, an intermediate point between the p-side switching element and the n-side switching element in each arm of the inverter 300 is connected to each phase coil of the motor generator MG.

The motor generator MG is a three-phase AC (Alternate Current) motor generator in which a permanent magnet is embedded in a rotor. The motor generator MG is mechanically connected to a not-illustrated driving wheel of the vehicle and is configured to generate a torque for driving the vehicle. Moreover, the motor generator MG is also capable of perform a regeneration of the electrical power (namely, electrical generation) by using an input of a motion energy of the vehicle, when the vehicle decelerates. When the vehicle is a hybrid vehicle which has an engine as the driving power source in addition to the motor generator MG, the motor generator MG may be mechanically connected to the engine and may be configured to be capable of performing the regeneration of the electrical power by using a driving power of the engine and assisting the driving power of the engine. Incidentally, the vehicle of the present embodiment may be this type of hybrid vehicle or an electrical vehicle which has only motor generator MG as the driving power source.

The motor driving system 10 has not-illustrated sensor group and employs a structure in which a voltage VB of the DC electrical power source B, a battery current IB (one example of the "current flowing in the boost converter or the DC electrical power source" of the present invention) which flows in the reactor L1 of the boost converter 200, the output voltage VH, a v-phase current Iv and a w-phase current Iw in the inverter 300 and a motor rotational phase θ which is a rotational angle of the rotor of the motor generator MG are detected at a proper timing. Moreover, each of sensors, which constitutes the sensor group, is electrically connected to the control apparatus 100 and such a structure that a detected value is monitored by the control apparatus 100 at a proper timing is employed.

In the motor driving system 10, the boost converter 200 and the inverter 300 are electrically connected to the control apparatus 100, and the control apparatus 100 is configured to control their operation states. Here, especially, the boost converter 200 is controlled by a boost control which is performed by the control apparatus 100. The boost control allows the voltage between the positive line and the negative line, namely the output voltage VH to be boosted to a voltage which is higher than the source voltage VB of the DC electrical power source B on the basis of a signal PWC which is supplied from the control apparatus 100. In this case, when the output voltage VH is lower than a VH instruction value VHtg which is a target value, an on-duty of the switching element Q2 becomes relatively large, and thus the current flowing in the positive line from the DC electrical power source B side to the inverter 300 can be increased and the output voltage VH can be increased. On the other hand, when the output voltage VH is higher than the VH instruction value VHtg, an on-duty of the switching element Q1 becomes relatively large, and thus the current flowing in the positive line from the inverter 300 side to the DC electrical power source B side can be increased and the output voltage VH can be decreased.

Next, with reference to FIG. 2, a structure of the boost controlling unit 110 in the control apparatus 100 which controls the boost converter 200 will be explained. Here, FIG. 2 is a block diagram of the boost controlling unit 110. Incidentally, in this drawing, an explanation of a feature which is same as that in FIG. 1 will be omitted by adding same reference sign.

In FIG. 2, the boost controlling unit 110 has an inverter input calculating unit 111, an adder/subtractor 112, a voltage control calculating unit 113, a carrier generating unit 114 and a comparator 115.

The inverter input calculating unit 111 is a circuit for generating the VH instruction value VHtg (namely, one example of the "boost instruction voltage" of the present invention) which represents the target value of the output voltage VH of the boost converter 200. For example, the inverter input calculating unit 111 generates the VH instruction value VHtg on the basis of an output value of the motor generator MG which can be calculated from a torque instruction value TR and a motor rotational velocity MRN for the motor generator MG such that a loss which arises when the motor generator MG is driven is the smallest. A value of the VH instruction value VHtg is adapted experimentally, experientially or theoretically in advance and is stored as an adapted value in the ROM.

The adder/subtractor 112 subtracts a detected value of the output voltage VH from the VH instruction value VHtg and outputs an result of the subtraction to the voltage control calculating unit 113. The voltage control calculating unit 113 calculates a controlling amount for matching the output voltage VH with the VH instruction value VHtg, after receiving the result of the subtraction, which is obtained by subtracting the detected value of the output voltage VH from the VH instruction value VHtg, from the adder/subtractor 112. In this case, for example, a well-know PI controlling calculation including a proportional term (P term) and an integrated term (I term) and so on is used. The voltage control calculating unit 113 outputs the calculated controlling amount as a voltage instruction value to the comparator 115.

On the other hand, the carrier generating unit 114 generates a carrier signal which is a triangle signal and outputs it to the comparator 115. The comparator 115 is configured to compare the voltage instruction value which is inputted from the voltage control calculating unit 113 with the carrier signal and generate the above described signal PWC whose logical state changes depending on a magnitude relationship between their voltages. The generated signal PWC is outputted to the switching elements Q1 and Q2 of the boost converter 200. The boost controlling unit 110 is configured as explained above.

Incidentally, although the structure illustrated in FIG. 2 is a circuit structure for performing a voltage control, the controlling method of the boost converter 200 is not limited to the voltage control. Here, with reference to FIG. 3, a boost controlling unit 110' in the control apparatus 100 will be explained. Here, FIG. 3 is a block diagram of the boost controlling unit 110'. Incidentally, in this drawing, an explanation of a feature which is same as that in FIG. 2 will be omitted by adding same reference sign.

In FIG. 3, the boost controlling unit 110' has an adder/subtractor 117 and current control calculating unit 118 which are located between the voltage control calculating unit 113 and the comparator 115.

On the other hand, the carrier generating unit 114 outputs the carrier signal to a S/H (Sample Hold) circuit 116 as well as the comparator 115. The S/H circuit 116 samples the battery current IB at timings when a top point and a bottom point of the carrier signal, which is inputted from the carrier generating unit 114, appear.

Here, in the boost controlling unit 110', the voltage control calculating unit 113 generates a current instruction value IR for matching the output voltage VH with the VH instruction value VHtg and the adder/subtractor 117 subtracts a detected value of the battery current IB which is sampled and hold by the S/H circuit 116 from this current instruction value IR. A result of the subtraction is outputted to the current control calculating unit 118.

The current control calculating unit 118 calculates a controlling amount for matching the battery current IB with the current instruction value IR. In this case, for example, the well-know PI controlling calculation including the proportional term (P term) and the integrated term (I term) and so on is used. The current control calculating unit 118 outputs the calculated controlling amount as a duty instruction value d to the comparator 115.

The comparator 115 compares a magnitude relationship between the duty instruction value d and the carrier signal, generates the signal PWC and outputs it to each switching element. Namely, the boost controlling unit 118' employ a circuit structure for performing a current control. Even this structure is capable of appropriately controlling the boost converter 200.

Next, with reference to FIG. 4, a structure of the inverter controlling unit 120 will be explained. Here, FIG. 4 is a block diagram of the inverter controlling unit 120. Incidentally, in this drawing, an explanation of a feature which is same as that in the above described drawing will be omitted by adding same reference sign.

In FIG. 4, the inverter controlling unit 120 has a current instruction converting unit 121, a current controlling unit 122, a two-phase/three-phase converting unit 123, a three-phase/two-phase converting unit 124, the carrier generating unit 114 (it is shared with the boost controlling unit 110) and a PWM converting unit 125.

The current instruction converting unit 121 generates a two-phase current instruction values (Idtg, Iqtg) on the basis of the torque instruction value TR of the motor generator MG.

On the other hand, the v-phase current Iv and the w-phase current Iw are inputted as a feedback information from the inverter 300 to the three-phase/two-phase converting unit 124. The three-phase/two-phase converting unit 124 converts three-phase current values including the v-phase current Iv and the w-phase current Iw into two-phase current values including a d-axis current Id and a q-axis current Iq. The converted two-phase values are outputted to the current controlling unit 122.

The current controlling unit 122 generates two-phase voltage instruction values including a d-axis voltage Vd and a q-axis voltage on the basis of the two-phase current instruction values which are generated by the current instruction converting unit 121 and a difference between the two-phase current values Id and Iq which is inputted from the three-phase/two-phase converting unit 124. The generated two-phase voltage instruction values Vd and Vqh are outputted to the two-phase/three-phase converting unit 123.

The two-phase/three-phase converting unit 123 converts the two-phase voltage instruction values Vd and Vq into three-phase voltage instruction values Vu, Vv and Vw. The converted three-phase voltage instruction values Vu, Vv and Vw are outputted to the PWM converting unit 125.

Here, the PWM converting unit 125 is configure to receive a carrier Car of a predetermined carrier frequency fcar from the carrier generating unit 114 and compares a magnitude relationship between the carrier Car and the converted three-phase voltage instruction values Vu, Vv and Vw. Furthermore, the PWM converting unit 125 generates u-phase switching signals Gup and Gun, v-phase switching signals Gyp and Gvn and w-phase switching signals Gwp and Gwn, whose logical states change depending on a result of the comparison, and outputs them to the inverter 300.

More specifically, signals to each of which an identifier "p" is added among the switching signals for any phase represents driving signals for driving the p-side switching elements (Q3, Q5 and Q7) among the switching elements for any phase, and signals to each of which an identifier "n" is added represents driving signals for driving the p-side switching elements (Q4, Q6 and Q8) among the switching elements for any phase.

Here, especially, when each phase voltage instruction value changed from a value which is smaller than the carrier Car to a value which is same as the carrier Car during the comparison of the carrier Car and each phase voltage instruction value, the switching signal for turning on the p-side switching element. Moreover, when each phase voltage instruction value changed from a value which is larger than the carrier Car to the value which is same as the carrier Car, the switching signal for turning on the n-side switching element. Namely, the switching signals are signals inextricably linked to each other, and one of the p-side and n-side switching elements for each phase is in an ON state and the other of the p-side and n-side switching elements for each phase is in an OFF state.

When the inverter 300 changes or keeps (maintains) its state to a driving state of each switching element which is defined by each phase switching signal, the motor generator MG is configured to be driven on the basis of a circuit state which corresponds to the changed or kept (maintained) driving state. Incidentally, the above described controlling method of the inverter 300 is one aspect of a PWM control what we call.

Incidentally, well-known overmodulation control and rectangular wave control are used in combination, as well as the above described PWM control, for the motor generator MG for driving the vehicle. Also in the motor driving system 10 of the present embodiment, the controlling method of the inverter 300 may be changed depending on a driving condition of the vehicle at a proper timing.

Operation of Embodiment

Next, the intermittent control which is performed by the control apparatus 100 will be explained as an operation of the present embodiment.

<Overview of Intermittent Control>

The boost converter 200 boosts the source voltage VB by the above described boost control which is performed by the control apparatus 100, when the source voltage VB of the battery B needs to be boosted. The boost control steadily keeps (maintains) the output voltage VH of the boost converter 200 at the VH instruction value VHtg. Incidentally, the VH instruction value VHtg may be a value of about 650V, for example.

On the other hand, the switching states of the switching elements Q1 and Q2 in the boost converter 200 constantly changes during a boost operation associated with the boost control. Since the changing of the switching state causes a variation of the voltage which is referred to as a switching ripple, and thus a boost loss Lcv constantly arises in the boost converter 200 during the boost control. The boost loss Lcv is a factor for increasing a total loss Lt which is a loss of whole electrical power system including the boost converter 200, the inverter 300 and the motor generator MG. The intermittent control which is performed by the control apparatus 100 in the motor driving system 10 is a control for reducing the total loss Lt.

<Detail of Intermittent Control>

Here, with reference to FIG. 5, a detail of the intermittent control will be explained. Here, FIG. 5 is a flowchart of the intermittent control. Incidentally, it is assumed that the intermittent control is a control which is repeatedly performed at a constant frequency by the control apparatus 100.

In FIG. 5, the control apparatus 100 determines whether or not the VH instruction value VHtg is higher than the source voltage VB, namely, whether or not the boost control is being performed (step S101). When the VH instruction value VHtg is equal to or lower than the source voltage VB (step S101: NO), the control apparatus 100 ends the intermittent control. Incidentally, as described above, since the intermittent control is the control which is repeatedly performed at the constant frequency, it will be performed again from step S101 after a predetermined time passes since the end.

When the VH instruction value VHtg is higher than the source voltage VB (step S101: YES), namely, when the boost control is being performed, the control apparatus 100 determines whether or not "1" is set to an intermittent flag (step S102). The intermittent flag is a flag which represents a performing history of the intermittent process of the boost control, and is kept (maintained) at "1" until it is cleared when the performing history exists. An initial value of the intermittent flag is "0". Therefore, when the intermittent control is performed firstly, a NO side operation will be performed at step S102.

When the intermittent flag is "0" (step S102: NO), the control apparatus 100 determines whether or not the output voltage VH of the boost converter 200 is stable (step S103). Here, "the output voltage VH being stable" has two meanings.

Namely, one is that the VH instruction value VHtg is constant for a certain period and the other is that the output voltage VH converges with the VH instruction value VHtg. Various processes are anticipated as an actual determining process at step S103. For example, in view of the latter meaning, a difference between the VH instruction value VHtg and the output voltage VH being equal to or smaller than a reference value, such a condition that the difference between the VH instruction value VHtg and the output voltage VH is equal to or smaller than the reference value being kept (maintained) for a predetermined time, a degree of a variation of the output voltage VH for a predetermined period being equal to or smaller than a predetermined value and the like may be used as a condition for the determination. When the output voltage VH is not stable (step S103: NO), the intermittent control ends.

On the other hand, when the output voltage VH is stable (step S103: YES), the control apparatus 100 suspends the boost converter 200 (step S107). Incidentally, the suspension of the boost converter 200 means a suspension of the boost operation of the boost converter 200 and means the shutdown of the boost converter 200.

After suspending the boost converter 200, the control apparatus 100 set "1" to the intermittent flag (step S108). Namely, the history of the intermittent process of the boost control is stored.

After setting "1" to the intermittent flag, the control apparatus 100 determines whether or not the output voltage VH is kept (maintained) within a range which is equal to or larger than a lower limiting value VHL and which is equal to or smaller than an upper limiting value VHH (step S109). The range between the lower limiting value VHL and the upper limiting value VHH is one example of the "range" of the present invention and each of the lower limiting value VHL and the upper limiting value VHH is one example of the "boundary value" of the present invention.

When the output voltage VH is kept (maintained) within the range (step S109; YES), the intermittent control ends. Moreover, the output voltage VH exceeds the range (step S109: NO), the control apparatus 100 cancels a measurement of suspending the boost converter 200 (step S110). Incidentally, the cancellation of the measurement of suspending the boost converter 200 means a restart of the boost control based on the VH instruction value VHtg. After the boost control restarts, the intermittent control ends.

On the other hand, since "1" is set to the intermittent flag at step S108, a YES side operation is performed at step S102 which is performed next (step S102: YES) and thus step S104 is performed.

At step S104, it is determined whether or not the VH instruction value VHtg is changed after the boost control is suspended lastly. As a complementary explanation, a driving condition of the motor generator MG which is the load apparatus constantly changes, even when the boost control is suspended. Therefore, the VH instruction value VHtg, which is set on the basis of the driving condition, may change as occasion demands. When the VH instruction value VHtg is changed after the boost control is suspended lastly (step S104: NO), the control apparatus 100 resets the intermittent flag to "0" (step S105) and ends the intermittent control.

On the other hand, when VH instruction value VHtg is not changed after the boost control is suspended lastly (step S104: YES), the control apparatus 100 determines whether or not the output voltage VH reaches the VH instruction value VHtg (step S106). Here, the output voltage VH changes to deviate from the VH instruction value VHtg until a measurement of canceling the suspension is performed at step S110. Therefore, a NO side operation is performed at step S106, and the boost control is kept to be suspended until the output voltage VH exceeds the range as long as the VH instruction value VHtg does not change.

Moreover, when the measurement of canceling the suspension is performed at step S110, the restarted boost control allows the output voltage VH to start to converge, from the output voltage VH at that time, with the VH instruction value VHtg used when the last boost control is performed. Therefore, the output voltage VH reaches the VH instruction value VHtg after a predetermined time passes and a YES side operation is performed at step S106. When the output voltage VH reaches the VH instruction value VHtg in this manner after the restart of the boost control (step S106: YES), the boost converter 200 is suspended again (step S107).

As described above, the intermittent control allows the output voltage VH to vary between the VH instruction value VHtg and the upper limiting value VHH or the lower limiting value VHL as long as the VH instruction value VHtg does not change. Incidentally, the case where the output voltage VH varies between the VH instruction value VHtg and the upper limiting value VHH means that the motor generator MG is in the regeneration state and the case where the output voltage VH varies between the VH instruction value VHtg and the lower limiting value VHL means that the motor generator MG is in the power-running state
<Effect of Intermittent Control>

Next, with reference to FIG. 6, an effect of the intermittent control will be explained. FIG. 6 is a timing chart which illustrates one example of a temporal transition of the output voltage VH and the boost loss Lcv during a period when the intermittent control is performed.

In FIG. 6, an upper part represents a temporal transition of the output voltage VH and a lower part represents a temporal transition of the boost loss Lcv. Incidentally, in FIG. 6, it is assumed that the VH instruction value VHtg is VHtga (VHtga>VB).

In the temporal transition of the output voltage VH, the output voltage VH is almost stable to be the VH instruction value VHtg at a time t0. Here, when this stable condition is kept (maintained) until a time t1, the YES side operation is performed at step S103 in the previous performed intermittent control and thus the boost converter 200 is suspended. When the boost converter 200 is suspended, the output voltage VH increases or decreases depending on the driving state of the motor generator MG which is the load apparatus. In FIG. 6, an illustrated PRF_VH1 (solid line) represents one example of the temporal transition in which the motor generator MG is in the power-running state and the output voltage VH decreases after the time t1. Moreover, an illustrated PRF_VH2 (dashed line) represents one example of the temporal transition in which the motor generator MG is in the regeneration state and the output voltage VH increases after the time t1. Incidentally, hereinafter, an example of PRF_VH1 will be explained.

When the output voltage VH, which continues to decrease after the time t1, reaches the lower limiting value VHLa which related to the VH instruction value VHtga, the NO side operation is performed at step S109 in the previous performed intermittent control and thus the boost control restarts. As a result, the output voltage VH reaches the VH instruction value VHtga again at a time t3. When the output voltage VH reaches the VH instruction value VHtga again at the time t3, the boost converter 200 is suspended again.

On the other hand, in the temporal transition of the boost loss Lcv, the boost loss Lcv, which is almost constant for a first period POD 1 from the time t0 to the time t1, becomes zero when the boost control is suspended at the time t1. The boost loss Lcv is kept (maintained) at zero for a second period POD2 from the time t1 to the time t2 at which the boost control restarts. Moreover, when the boost control restarts at the time t2, the boost loss Lcv increases and becomes a value which is larger than zero for a third period POD3 from the time t2 to the time t3 at which the boost control is suspended again.

Here, a sum, whose reference value (i.e. zero value) is a boost loss Lcv when the output value VH is kept (maintained) at the VH instruction value VHtg, of the boost loss Lcv for one term from the suspension of the boost control to the re-suspension of the boost control via the cancellation of the suspension, namely, for a period which is obtained by combining the second period POD2 and the third period POD3 is a difference between a loss reduced amount and a loss increased amount.

The loss reduced amount is a sum of an illustrated loss reduced amount Lcvrd1 (a dark hatching part with diagonal lines) and an illustrated loss reduced amount Lcvrd2 (a light hatching part with diagonal lines), and the loss increased amount is an illustrated loss increased amount Lcvinc (a hatching part with horizontal lines). In FIG. 6, for the purpose of the illustration, an absolute value of the loss reduced amount Lcvrdc2 is same as that of the loss increased amount Lcvinc and the sum of the boost loss Lcv which is realized by the intermittent control is same as the loss reduced amount Lcvrdc1. The boost loss Lcv is significantly reduced by the intermittent control, because the loss reduced value Lcvrdc is a negative value. Incidentally, as more gently the output voltage VH varies after the suspension of the boost control, the more the total sum is toward the negative side.

Next, with reference to FIG. 7, the boost loss Lcv which arises in the boost converter 200 per unit time during the intermittent control will be explained. Here, FIG. 7 is a diagram which illustrates one example of a relationship between a converter loss Lcvt and the battery current IB when the intermittent control is performed. Incidentally, the converter loss Lcvt is a value which is obtained by dividing a total sum of the boost loss Lcv for one term from the suspension of the boost control to the re-suspension of the boost control via the cancellation of the suspension, namely, for a period which is obtained by combining the second period POD2 and the third period POD3 with the length of this period, and means the boost loss which arises in the boost converter per unit time.

In FIG. 7, the converter loss Lcvt is illustrated along a vertical axis and the battery current IB is illustrated along a horizontal axis.

An illustrated PRF_Lcvtcmp (see a dashed line) is a comparative example and is the converter loss when the intermittent control of the present embodiment is not performed and the output voltage VH is kept (maintained) at the VH instruction value VHtg for the period.

On the other hand, an illustrated PRF_Lcvt (see a solid line) is the converter loss when the intermittent control of the present embodiment is performed. As illustrated herein, when the intermittent control of the present embodiment is performed, since the boost loss Lcv is zero during the second period POD2, converter loss Lcvt which is a value per unit time is reduced more significantly than the comparative example even when the boost loss Lcv increases in some degree during the third period POD3. Especially, the converter loss Lcvt is significantly reduced when the battery current IB is sufficiently small, because the second period POD2 is relatively long. Namely, the intermittent control is capable of reducing the total loss Lt by reducing the converter loss Lcvt.

<Setting of Range>

Here, with reference to FIG. 8 and FIG. 9, the range within which the output voltage VH is to be kept (maintained) and which is used for the intermittent control will be explained. Here, FIG. 8 is a diagram for explaining one aspect of setting the upper and lower limiting values which defines the range. FIG. 9 is a diagram for explaining another aspect of setting the upper and lower limiting values which defines the range. Incidentally, in these drawings, an explanation of a feature which is same as that in the above described drawing will be omitted by adding same reference sign.

In FIG. 8, the total loss Lt and the output voltage VH are illustrated along a vertical axis and a horizontal axis, respectively. Moreover, an illustrated PRF_ON (dashed line) illustrates an characteristics of the total loss Lt when the boost control is performed in the boost converter 200 and an illustrated PRF_OFF (solid line) illustrates an characteristics of the total loss Lt when the boost control is suspended in the boost converter 200.

The VH instruction value VHtg of the boost converter 200 is decided such that the total loss Lt is minimum with respect to the driving condition of the motor generator MG which is the load apparatus (see a white circle), and the total loss Lt increases even when the output voltage VH increases or decreases from the VH instruction value VHtg. The above described quadric relationship does not change even when the boost converter 200 is suspended, and the characteristics PRF_OFF has a shape which is obtained by moving the characteristics PRF_ON toward an lower direction by an amount corresponding to the boost loss Lcv of the boost converter 200.

Here, when the intermittent control is performed under such a condition that the output voltage VH is kept (maintained) at VHex1, the total loss Lt is a value which corresponds to a range from an illustrated marker mk1 to an illustrated marker mk2 on the characteristics PRF_OFF, because an energy which is stored by the capacitor C varies after the boost control is suspended. At this timing, the suspension of the boost control is significantly effective for the reduction of the total loss Lt.

On the other hand, the output voltage VH gradually deviates from the VH instruction value (in this case, VHex1) depending on the driving condition of the motor generator MG. Namely, the output voltage VH gradually decreases when the motor generator MG is in the power-running state and the output voltage VH gradually increases when the motor generator MG is in the regeneration state. As a result, the marker mk1 moves toward a left side on the characteristics PRF_OFF and the marker mk2 moves toward a right side on the characteristics PRF_OFF. In any case, the total loss Lt gradually increases.

On the other hand, during a period when the total loss Tt gradually increases, the total loss Lt in performing the boost control reaches the total loss Lt1 (an illustrated marker mk3 or mk4) corresponding to the VH instruction value VHex1 in performing the boost control. When the total loss Lt reaches Lt1, there is no advantage to suspend the boost control. Namely, if the boost control is continued to be suspended more, the total loss Lt is larger than the total loss Lt1 in continuing the boost control.

From this view point, it is reasonable and rational to decide VHLex1 corresponding to the illustrated marker mk3 as the lower limit value of the range and to decide VHHex1 corresponding to the illustrated marker mk4 as the upper limit value of the range. Namely, the range may be decided as described above.

FIG. 9 illustrates another method of setting the range.

In FIG. 9, the range is decided as a range of a predetermined percentage to the VH instruction value VHex2.

Namely, VHex2−x*VHex2 is decided as a lower limiting value VHLex2 and VHex2+x*VHex2 is decided as an upper limiting value VHHex2, by using a correction coefficient x (x<1). As illustrated, it is not difficult to set the upper and lower limiting values by appropriately setting the correction coefficient x such that the total loss Lt does not exceeds Lt1. A load of the control apparatus 100 is reduced when the range is uniformly decided as the range of the percentage to the VH instruction value VHtg.

In the present embodiment, one portion of the method of setting the upper and lower limiting values which defines the range is explained with reference to FIG. 8 and FIG. 9, however, the aspect of setting the range is not limited to the above described examples. In an extreme case, the source voltage VB may be set to the lower limiting value and a withstand voltage of the boost converter 200 may be set to the upper limiting value.

Second Embodiment

Next, with reference to FIG. 10, the intermittent control in the second embodiment of the present invention will be explained. Here, FIG. 10 is a flowchart of the intermittent control in the second embodiment. Incidentally, in this drawing, an explanation of a feature which is same as that in FIG. 5 will be omitted by adding same reference sign.

In FIG. 10, when the intermittent flag is "1" at the step S102 (step S102: YES), the control apparatus 100 determines whether or not the driving condition of the electrical power system including the boost converter 200, the inverter 300 and the motor generator MG changes after the boost control is previously suspended (step S201). The driving condition is not limited, however, it is assumed that the driving condition is the battery current IB in this case.

On the other hand, when the intermittent flag is "0" at the step S102 (step S102: NO), the control apparatus 100 determines whether or not an intermittent allowance condition is satisfied (step S202). The intermittent allowance condition includes a condition that an absolute value of the battery current IB as the driving condition which is explained at the step S201 is within a predetermined value, in addition to a condition that the output voltage VH is stable as explained in the first embodiment. When the intermittent allowance condition is satisfied (step S202: YES), the boost converter 200 is suspended (step S107), and when the intermittent allowance condition is not satisfied (step S202: NO), the intermittent control ends.

As described above, the intermittent control in the second embodiment is configured to use the battery current IB as a determination factor for determining whether or not the boost control is to be suspended. Here, with reference to FIG. 11, a meaning of using the battery current IB as the above described determination factor will be explained. Here, FIG. 11 is a diagram which illustrates one example of characteristics of a loss difference ΔLcv of the boost converter 200 to the battery current IB.

Incidentally, the loss difference ΔLcv means a difference from the boost loss Lcv when the intermittent control of the boost control is not performed, namely, when the output voltage VH is kept (maintained) at the VH instruction value VHtg, and means that the loss increases when it is a positive value and the loss decreases when it is a negative value. In FIG. 11, the loss difference iLcv is the positive value in an illustrated loss increasing area (see a hatching part) in which the battery current IB is large toward the negative direction.

Here, with reference to FIG. 12, a reason why the boost loss Lcv increases as described above will be explained.

Here, FIG. 12 is a diagram which illustrates one example of a temporal transition of the output voltage VH and the boost loss Lcv during a period when the intermittent control is performed. Incidentally, in this drawing, an explanation of a feature which is same as that in FIG. 6 will be omitted by adding same reference sign.

FIG. 12 illustrates a case where the boost control is suspended under such a condition that the output voltage VH is kept (maintained) at the VH instruction value VHtga. However, in this case, an absolute value of the battery current IB is larger than that in the case illustrated in FIG. 6 and is a value in the loss increasing area which is explained in FIG. 11.

The boost control is suspended at the time t3. When the boost control is suspended, the electrical power which is supplied to the motor generator MG is an electrical power which is outputted from the capacitor C, and the output voltage VH decreases because the energy which is stored in the capacitor C is represented by $½*c*(VH)^2$, wherein the capacitance of the capacitor C is c. Here, when the large current IB which corresponds to the loss increasing area flows, a time that elapses before the output voltage VH reaches the lower limiting value VHLa is reduced because a decreasing speed of the output voltage VH becomes large. As a result, the output voltage VH reaches the lower limiting value VHLa and the boost control restarts at a time t4. Moreover, the output voltage VH reaches the VH instruction value VHtga again at a time t5.

Here, a sum, whose reference value (i.e. zero value) is a case where the output value VH is kept (maintained) at the VH instruction value VHtg, of the boost loss Lcv for one term from the suspension of the boost control to the re-suspension of the boost control via the cancellation of the suspension, namely, for a period from the time t3 to the time t5 is calculated. Although the sum of the loss is the difference between the loss reduced amount Lcvrdc (the negative value) and the loss increased amount Lcvinc the positive value), the loss reduced amount Lcvrdc decreases significantly more as the battery current IB becomes larger and the loss increased amount Lcvinc is less affected by the battery current IB. As a result, the sum of the loss is likely the positive value and the boost loss Lcv becomes larger than the reference value. Namely, in this case, the intermittent control of the boost control result in the increasing of the boost loss Lcv.

Third Embodiment

Next, the intermittent control in the third embodiment of the present invention will be explained. Incidentally, FIG. 10 is used for the explanation, because the intermittent control in the third embodiment is same as that in the second embodiment, which is illustrated as one example in FIG. 10, on the drawing.

In the intermittent control in the third embodiment, the "driving condition" at the step S201 and the "intermittent allowance condition" at the step S202 are different from those in the second embodiment. Specifically, in the third embodiment, a change rate of the output of the motor generator MG or the battery B is used as the driving condition. The change rate of the output means not an absolute value of the output but its temporal change rate.

In this case, the "intermittent allowance condition" at the step S202 is defined as the condition that the change rate of the output is within a predetermined value. Incidentally, this condition may be used in addition to the condition that "the output voltage VH is stable" in the first embodiment and the condition that "the absolute value of the battery current IB is within the predetermined value" in the second embodiment.

Here, the battery current IB and the output of the motor generator MG transiently passes a zero point when an accelerator pedal is frequently released, when a rapid acceleration or a rapid deceleration is performed, when the vehicle slips or when an excessive grip arises, which are one example of the case where the change rate of the output of the motor generator MG or the battery B is large. However, if the boost control is allowed to be suspended under the above described transient state, the operation of the boost converter 200 is not likely capable of following a rapid change of the driving condition. So, in the present embodiment, the intermittent control of the boost control is restricted under this type of the transient state, and the performance of the motor driving system 10 is maintained.

Incidentally, a change rage of a motor rotational number or an acceleration position which is an operated amount of the accelerator pedal may be used, instead of the change rate of the output which is explained here as one example.

Fourth Embodiment

Although an example in which one motor generator MG is used as the load apparatus of the present invention is explained in the first to third embodiments, the load apparatus may be a plurality of motor generators. Here, the intermittent control of the boost control in a hybrid vehicle 1 which has two motor generators MG as the load apparatuses will be explained.

Structure of Embodiment

Firstly, with reference to FIG. 13, a structure of the hybrid vehicle 1 in the fourth embodiment of the present invention will be explained. Here, FIG. 13 is a conceptual structure diagram which conceptually illustrates the structure of the hybrid vehicle 1. Incidentally, in this drawing, an explanation of a feature which is same as that in the above described drawing will be omitted by adding same reference sign.

In FIG. 13, the hybrid vehicle 1 is one example of the "vehicle" of the present invention which has the control apparatus 100, a motor driving system 20, an acceleration position sensor 400, a vehicle velocity sensor 500 and a hybrid driving apparatus HB.

The hybrid driving apparatus HB is a driving unit for driving the hybrid vehicle 1 by supplying a driving torque as the driving power to a left axle shaft SFL (corresponding to a left front wheel FL) and a right axle shaft SFR (corresponding to a right front wheel FR) which are axle shafts of the hybrid vehicle 1. A detailed structure of the hybrid driving apparatus HB will be described later.

The motor driving system 20 is another example of the "electrical power supply system" of the present invention for driving a motor generator MG1 and a motor generator MG2 which are the load apparatuses.

Here, with reference to FIG. 14, a structure of the motor driving system 20 will be explained. Here, FIG. 14 is a system structure diagram of the motor driving system 20. Incidentally, in this drawing, an explanation of a feature which is same as that in FIG. 1 will be omitted by adding same reference sign.

In FIG. 14, the motor driving system 20 is different from the motor driving system 10 in the first to third embodiments in that it has an inverter 310 instead of the inverter 300. The inverter 310 includes a second inverter circuit 3102 (an inverter circuit having the p-side switching elements of Q3, Q5 and Q7 and the n-side switching elements of Q4, Q6 and Q8) which is for driving the motor generator MG2, which corresponds to the motor generator MG in the above described embodiments, and whose structure is same as that of the inverter 300 in the above described embodiments and a first inverter circuit 3101 which is for driving the motor generator MG1. The first inverter circuit 3101 is electrically connected in parallel to the second inverter circuit 3102.

The first inverter circuit 3101 has, as the switching elements, p-side switching elements Q13, Q15 and Q17 and n-side switching elements Q14, Q16 and Q18 for the u-phase, the v-phase and the w-phase, respectively. The same is true on the rectifier elements.

Again in FIG. 13, the acceleration position sensor 400 is a sensor which is configured to be capable of detecting an acceleration position Ta which is the operated amount of the not-illustrated acceleration pedal of the hybrid vehicle 1. The acceleration position sensor 400 is electrically connected to the control apparatus 100 and such a structure that a detected acceleration position Ta is monitored by the control apparatus 100 at a proper timing is employed.

The vehicle velocity sensor 500 is a sensor which is configured to be capable of detecting a vehicle velocity V of the hybrid vehicle 1. The vehicle velocity sensor 500 is electrically connected to the control apparatus 100 and such a structure that a detected vehicle velocity V is monitored by the control apparatus 100 at a proper timing is employed.

Next, with reference to FIG. 15, the detailed structure of the hybrid driving apparatus HB will be explained. Here, FIG. 15 is a conceptual structure diagram which conceptually illustrates the structure of the hybrid driving apparatus HB.

In FIG. 15, the hybrid driving apparatus HB has an engine 600, an input shaft IS, a MG1 output shaft 700, a power split mechanism 800, a driving shaft OS, the motor generator MG1, the motor generator MG2 and a reduction mechanism 900.

The engine 600 is a multiple cylinder engine which is one example of the "engine" of the present invention and is configured to function as the main driving power source for the hybrid vehicle 1. Here, with reference to FIG. 16, a detailed structure of the engine 600 will be explained. Here, FIG. 16 is a conceptual cross-sectional diagram which conceptually illustrates the structure of the engine 600.

Incidentally, the "engine" in the present invention means a concept comprehensively including an engine which has at least one cylinder and which is configured to be capable of extracting a heat energy, which is generated when a mixture gas including some type of fuel such as a gasoline, a light diesel oil, an alcohol or the like burns in the cylinder, as a motion energy via a physical or mechanical transmitting device such as a piston, a connecting rod, a crank shaft and the like. As long as the above described concept is satisfied, the structure of the engine in the present invention is not limited to that of the engine 600 and may be another type of structure.

In FIG. 16, the engine 600 is configured to burn the mixture gas by an igniting operation of an ignition apparatus 602 having a spark plug (its reference sign is omitted) whose one portion is exposed on a combustion chamber in the cylinder 601, and to convert a reciprocating motion of the piston 603, which is caused by an explosive power due to the above described burning, to a rotational motion of the crank shaft 605 by the connecting rod 604. A crank position sensor 606 which is capable of detecting a crank angle θcrk which is a rotational angle of the crank shaft 605 is placed near the crank shaft 605. The crank position sensor 606 is electrically connected to the control apparatus 100 (not illustrated) and the control apparatus 100 is capable of calculating an engine rotational velocity NE of the engine 600 on the basis of the crank angle signal which is outputted from the crank position sensor 606.

In the engine 600, an air which is introduced from the exterior passes an intake pipe 607 and is introduced to an inside of the cylinder 601 via an intake port 610 when an intake valve 611 is opened. On the other hand, a fuel injection valve of an injector 612 is exposed on the intake port 610 and is configured to be capable of injecting the fuel into the intake port 610. The fuel which is injected from the injector 612 is mixed with the intake air after and/or before the intake valve 611 is opened and turns into the mixture gas.

The fuel is stored in a not-illustrated fuel tank, and such a structure that the fuel is supplied to the injector 612 via a not-illustrated delivery pipe by a function of a not-illustrated feed pump is employed. The mixture gas which burns in the cylinder 601 turns into an emission and is introduced to an exhaust pipe 615 via an exhaust port 614 when an exhaust valve 613 which is opened and closed in conjunction with the open/close of the intake valve 611 is opened.

A three-way catalyst is placed on the exhaust pipe 615. The three-way catalyst is a well-known catalyst apparatus for an emission purification which is configured to clean up the emission of the engine 600 by simultaneously performing an oxidation-burning reaction of CO (Carbon Monoxide) and HC (Hydro Carbon) which are exhausted from the engine 600 and a reduction reaction of NOx (Nitrided Oxide) which is also exhausted from the engine 600.

An air-fuel ratio sensor 617 which is configured to detect an air-fuel ratio of the emission of the engine 600 is placed on the exhaust pipe 615. Moreover, a water temperature sensor 618 which is for detecting a cooling water temperature of a cooling water (LLC) which circulates for cooling the engine 600 is placed on a water jacket which is placed on a cylinder block in which the cylinder 201 is placed. These air-fuel ratio sensor 617 and the water temperature sensor 618 are electrically connected to the control apparatus 100 and such a structure that the detected air-fuel ratio and cooling water temperature are monitored by the control apparatus 100 at a proper timing is employed.

On the other hand, a throttle valve 608, which is capable of adjusting an intake air amount of the intake air which is introduced via a not-illustrated cleaner, is placed at an upstream side of the intake port 610 on the intake pipe 607. The throttle valve 608 is configured such that its driving state is controlled by a throttle valve motor 609 which is electrically connected to the control apparatus 100. The control apparatus 100 basically controls the throttle valve motor 609 such that a throttle position depends on a position of the not-illustrated acceleration pedal (namely, the above described acceleration position Ta), however, is capable of adjusting the throttle position without a driver's intention by controlling the operation of the throttle valve motor 609. Namely, the throttle valve 608 is configured as one portion of an electrically controlled throttle.

Again in FIG. 15, the motor generator MG1 is a motor generator which is one example of the "first rotating electrical machine" of the present invention, and is configured to have a power-running function for converting the electrical energy into the motion energy and a regeneration function for converting the motion energy into the electrical energy. The motor generator MG2 is a motor generator which is one example of the "second rotating electrical machine" of the present invention, and is configured to have the power-running function for converting the electrical energy into the motion energy and the regeneration function for converting the motion energy into the electrical energy, as with the motor generator MG1. Incidentally, each of the motor generators MG1 and MG2 is configured as a three-phase synchronous motor generator, for example, and is configured to have a rotor which has a plurality of permanent magnets on its outer surface and a stator to which a three-phase coil for generating a rotating magnetic field is wound, however, may adopt another structure.

The power split mechanism 800 is a planetary gear train having two degree of freedom of rotation which is one example of the "differential mechanism" of the present invention and which has: a sun gear S1 which is placed on a center and which is one example of the "first rotating element" of the present invention; a ring gear R1 which is concentrically placed at an outer side of the sun gear S1 and which is one example of the "third rotating element" of the present invention; a plurality of pinion gears P1 each of which is placed between the sun gear S1 and the ring gear R1 and revolves about the sun gear S1 while rotating; and a carrier C1 which supports a rotational axis of each pinion gear P1 and which is one example of the "second rotating element" of the present invention.

In the power split mechanism 800, the sun gear S1 is fixed to the MG1 output shaft 700 (which is connected to the rotor RT of the motor generator MG1) which is an output shaft of the motor generator MG1, and its rotational velocity is equivalent to a MG1 rotational velocity Nmg1 which is a rotational velocity of the motor generator MG1. Moreover, the ring gear R1 is connected to the driving shaft OS, and its rotational velocity is equivalent to an output rotational velocity Nout which is a rotational velocity of the driving shaft OS. Incidentally, the rotor of the motor generator MG2 is fixed to the driving shaft OS and the output rotational velocity Nout is same as a MG2 rotational velocity Nmg2 which is a rotational velocity of the motor generator MG2. The carrier C1 is connected to an input shaft IS which is connected to the crank shaft 605 of the engine 600, and its rotational velocity is equivalent to the engine rotational velocity NE of the engine 600. Incidentally, in the hybrid driving apparatus HB, each of the MG1 rotational velocity Nmg1 and the MG2 rotational velocity Nmg2 is detected by a rotational sensor such as a resolver or the like with a constant cycle and is outputted to the control apparatus 100 with a constant cycle or an inconstant cycle.

The driving shaft OS is connected to the driving shafts SFR and SFL (namely, these driving shafts are one example of the "axle shaft" of the present invention) for driving the right front wheel FR and the left front wheel FL which are driving wheels of the hybrid vehicle 1 via the reduction mechanism 900 which is a reduction apparatus having some type of gear such as a differential gear and the like. Therefore, a motor torque Tmg1 which is transmitted to the driving shaft OS when the motor generator MG2 is in a power-running state is transmitted to each driving shaft via the reduction mechanism 900 and is used as the driving power for the hybrid vehicle 1 to move. On the other hand, a driving power which is transmitted to the driving shaft OS via each driving shaft and the reduction mechanism 900 when the motor generator MG2 is in a regeneration state is used as a driving power for the motor generator MG 2 to generate the electrical power. In this case, the motor torque Tmg1 of the motor generator MG2 is some type of a regeneration torque and its magnitude is correlated to a magnitude of a regenerated electrical power and a magnitude of a braking force (a regeneration braking force) which is applied to the driving wheels via the driving shaft OS. The MG2 rotational velocity Nmg2 is unambiguously related to the vehicle velocity to V of the hybrid vehicle 1.

In the hybrid driving apparatus HB, the power split mechanism 800 is capable of distributing an engine torque Te, which is transmitted to the input shaft IS from the engine 600 via the crank shaft 605, to the sun gear S1 and the ring gear R1 at a predetermined ration (a ratio depending on a gear ratio among gears) via the carrier C1 and the pinion gear P1 and splitting (dividing) the driving power of the engine into two. More specifically, if a gear ratio of a number of teeth of the sun gear S1 to a number of teeth of the ring gear R1 is defined as p for the purpose of an explanation of the operation of the power split mechanism 800, a torque Tes which is transmitted to the MG1 output shaft 700 is represented by a below described formula 1 and an engine directly-transmitted torque Tep which is transmitted to the driving shaft OS is represented by a below described formula 2, when the engine torque Te is transmitted from the engine 600 to the carrier C1.

$$Tes = Te * p/(1+p) \quad (1)$$

$$Tep = Te * 1/(1+p) \quad (2)$$

Incidentally, the structure of the embodiment which is related to the "differential mechanism" of the present invention is not limited to the example which is illustrated as the power split mechanism 800. For example, the differential mechanism of the present invention may have a plurality of planetary gear trains, a plurality of rotating elements in one planetary gear train may be respectively connected to a plurality of rotating elements in another planetary gear train, and a unified differential mechanism may be configured.

Moreover, although the reduction mechanism 900 in the present embodiment merely reduces the rotational velocity of the driving shaft OS depending on a reduction ratio which are set in advance, the hybrid vehicle 1 may have a multi-stage transmission apparatus having a plurality of transmission stages whose components are a plurality of clutch mechanisms and a braking mechanism, for example, separately from this type of the reduction mechanism.

Operation of Embodiment

Operation of Power Split Mechanism 800

In the hybrid vehicle 1 in the present embodiment, some type of an electrical CVT (Continuously Variable Transmission) function is achieved by a differential function of the power split mechanism 800 which is the differential mechanism. Here, with reference to FIG. 17, the operation of the power split mechanism 800 will be explained. Here, FIG. 17 is an operational alignment chart of the hybrid driving apparatus HB. Incidentally, in this drawing, an explanation of a feature which is same as that in FIG. 15 will be omitted by adding same reference sign.

In FIG. 17, a vertical axis represents the rotational velocity and a horizontal axis represents the motor generator MG1 (unambiguously sun gear S1), the engine 600 (unambiguously carrier C1) and the motor generator MG2 (unambiguously ring gear R1) in this order from a left side.

Here, the power split mechanism 800 is a planetary gear train having a differential function in which there is two degree of freedom of rotation among the rotational elements, and is configured such that the rotational velocity of remaining one rotational element is inevitably decided when the rotational velocity of two rotational elements are decided. Namely, on the operational alignment chart, an operational state of each rotational element can be represented by one operational alignment line which is associated with one operational state of the hybrid driving apparatus HB one by one. Incidentally, hereinafter, a point on the operational alignment chart is represented by an operational point mi (i is a natural number). Namely, one operational point mi is associated with one rotational velocity.

In FIG. 4, it is assumed that an operational point of the motor generator MG2, whose rotational velocity is unambiguously related to the vehicle velocity V, is an operational point m1. In this case, when an operational point of the motor generator MG1 is an operational point m2, an operational point of the engine 600 which is the remaining one rotational element is an operational point m3. In this case, when the operational point of the motor generator MG1 is changed to an operational point m4 and an operational point m5 while the rotational velocity of the driving shaft OS is kept (maintained), the operational point of the engine 600 is changed to an operational point m6 and an operational point m7, respectively.

Namely, the hybrid driving apparatus HB allows the engine 600 to operate at a desired operation point by using the motor generator MG1 as a rotational velocity control apparatus. The operational point (the operation point in this case is defined by a combination of the engine rotational velocity NE and the engine torque Te) of the engine 600 is basically controlled to be an optimum fuel consumption operational point at which a consumption rate of the fuel by the engine 600 is minimum.

Incidentally, as a complementary explanation, in the power split mechanism 800, it is required to transmit a reaction torque, whose magnitude is same as that of the above described torque Tes and whose sign is opposite to that of the above described torque Tes (namely, which is a negative torque) which depends on the engine torque Te, to the MG1 output shaft 700 from the motor generator MG1, in order to transmit the engine directly-transmitted torque Tep related to the above described engine torque Te to the driving shaft OS. In this case, MG1 is in the regeneration state, in which the rotational direction is positive and torque is negative, at the operational point in a positive rotation area such as the operation point m2 or the operation point m4. Namely, the hybrid driving apparatus HB is capable of generating the electrical power while transmitting one portion of the engine torque Te to the driving shaft OS by allowing the motor generator MG1 to function as an reaction factor. When a driving shaft required torque Tpn, which is a torque required for the driving shaft OS, is not satisfied by the engine directly-transmitted torque Tep, the motor generator MG2 transmits the motor torque Tmg2 to the driving shaft OS at a proper timing.

<Intermittent Control in Power Circulation>

In the hybrid driving apparatus HB performing the above described basic operation, a power circulation arises when the hybrid vehicle 1 performs a high-velocity/small load running. Here, with reference to FIG. 18, the power circulation in the hybrid driving apparatus HB will be explained. Here, FIG. 18 is an operational alignment chart when the power circulation of the hybrid driving apparatus HB arises. Incidentally, in this drawing, an explanation of a feature which is same as that in FIG. 17 will be omitted by adding same reference sign.

In FIG. 18, it is assumed that the operational points of the motor generator MG2 and the engine 200 are respectively the illustrated operational points m1 and m7 which represent a high velocity area and high small load running in which only the engine directly-transmitted torque Tep satisfy the driving shaft required torque Tpn.

In this case, the operational point of the motor generator MG1 is unambiguously decided to be the operational point m5 and the rotational velocity (the MG1 rotational velocity Nmg1) is a value in a negative rotation area. On the other hand, the motor generator MG1 is the reaction factor which transmits the engine directly-transmitted torque Tep to the driving shaft OS and the MG1 torque Tmg1 as its output torque is a negative torque. Namely, in this condition, the motor generator MG1 is in a negative rotation/negative torque state and is in the power-running state as the driving state.

When the motor generator MG1 is in the power-running state, MG1 torque Tmg1 is transmitted to the output shaft OS as the driving torque, and thus the driving torque which is transmitted to the output shaft OS is larger than the driving shaft required torque Tpn. Thus, one portion of the excessive torque is used by the motor generator MG2. Namely, in this case, the motor generator is in the regeneration state in which the rotational direction is positive and the torque is negative. Therefore, in this state, some type of an electrical path is formed between the motor generator MG1 and the motor generator MG2. This state is the power circulation state. In the hybrid driving apparatus HB being in the power circulation state, the electrical power which is regenerated by the motor generator MG2 is used for the power-running of the motor generator MG1.

Here, with reference to FIG. 19, the electrical path in the motor driving system 20 being in the power circulation state will be explained. Here, FIG. 19 is a diagram which explains the electrical path when the power circulation arises in the motor driving system 20.

In FIG. 19, when the power circulation arises, most portion of the regenerated electrical power which is generated by the motor generator MG2 is consumed by the power-running of the motor generator MG1 (see PWR2 (solid line) in the drawing). Moreover, one portion of the regenerated electrical power which is not consumed by the power-running of the motor generator MG1 is supplied to the capacitor C (see PWR1 (dashed line) in the drawing).

As illustrated in FIG. 19, when the power circulation arises, small electrical power is supplied to the capacitor C and the output voltage VH of the boost converter 200 varies very mildly when the boost control is suspended. Therefore, when the power circulation arises, various intermittent controls which are explained in the first to third embodiments functions very effectively.

Fifth Embodiment

As explained in the fourth embodiment, in the hybrid vehicle 1, when the hybrid driving apparatus HB is in the power circulation state, the intermittent control of the boost converter 200 functions effectively. However, in the fourth embodiment, the power circulation is merely used as the intermittent allowance condition. So, in the fifth embodiment, the intermittent control which is capable of prolonging a period, at which the boost control is suspended, as long as possible when the power circulation arises will be explained.

Firstly, with reference to FIG. 20, the detail of this intermittent control will be explained. Here, FIG. 20 is a flowchart of the intermittent control in the fifth embodiment. Incidentally, in this drawing, an explanation of a feature which is same as that in FIG. 10 will be omitted by adding same reference sign.

In FIG. 20, when it is determined at the step S202 that the intermittent allowance condition is satisfied (step S202: YES), the control apparatus 100 further determines whether or not the hybrid driving apparatus HB is in the power circulation state (step S301). When the power circulation does not arise (step S301: NO), the process at the step S107 is performed and the boost converter 200 is suspended.

On the other hand, when the intermittent allowance condition is satisfied by the power circulation (step S301: YES), the control apparatus 100 performs an electrical power adjusting process which uses the motor generator MG1 (step S302). After the electrical power adjusting process is performed, the process at the step S107 is performed and the boost converter 200 is suspended.

The electrical power adjusting process is performed on the basis of the output voltage VH. Specifically, the electrical energy which is supplied to the capacitor C when the power circulation arises can be accurately detected on the basis of the output voltage VH which can be accurately detected by the sensor, because the electrical energy which is stored in the capacitor C can be calculated by the above described ½*c*(VH)^2. Thus, the increased electrical energy is consumed by the power-running of the motor generator MG1 with a predetermined cycle.

Here, with reference to FIG. 21, an effect of the above described electrical power adjusting process will be explained. Here, FIG. 21 is a drawing which illustrates the electrical path when the power circulation arises in the motor driving system 20 in which the electrical power adjusting process is performed. Incidentally, in this drawing, an explanation of a feature which is same as that in FIG. 19 will be omitted by adding same reference sign.

In FIG. 21, the electrical path (PWR1) to the capacitor C, which arises to a lesser extent when the power circulation arises, disappears due to a function of the electrical power adjusting process, and thus the electrical power is transmitted only between the motor generator MG1 and the motor generator MG2. Namely, the electrical path in the motor driving system 20 is only the electrical path (namely, the illustrated PWR2) from the motor generator MG2 to the motor generator MG1.

According to the intermittent control including the above described electrical power adjusting process, it is possible to prolong the period at which the boost converter 200 is suspended as long as possible and to reduce the total loss Lt adequately, because the output voltage VH does not vary.

Sixth Embodiment

Next, the sixth embodiment which is obtained by modifying the intermittent control in the fifth embodiment will be explained.

According to the electrical power adjusting process in the fifth embodiment, the sum of the electrical power transmitted between the motor generator MG1 and the motor generator MG2 is kept (maintained) by the electrical power adjustment at the motor generator MG1 side. There is an below described concern in the electrical power adjustment at the motor generator MG1 side, although there is more flexibility in the motor generator MG1 than in the motor generator MG2 which is connected to the driving shaft OS and a range of the adjustment can be easily provided.

Namely, the MG1 rotational velocity Nmg1 is originally a small value when the power circulation arises. Therefore, when the electrical power adjustment is performed, a range of the adjustment of the MG1 torque Tmg1 is inevitably large. Since the MG1 torque Tmg1 is the reaction torque, the engine rotational velocity NE of the engine 200 is affected when the range of the adjustment of the MG1 torque Tmg1 is large. Briefly speaking, the engine rotational velocity NE likely varies largely.

In the sixth embodiment, the electrical power adjusting process which is modified to solve the above described problem is performed. So, with reference to FIG. 22, the above described electrical power adjusting process in the sixth embodiment will be explained. Here, FIG. 22 is an operational alignment chart when the electrical power adjusting process in the sixth embodiment is performed.

In FIG. 22, it is assumed that a solid line is an original operational alignment line when the power circulation arises. Against this line, it is assumed that the operational alignment line is changed to the illustrated dashed line by changing the operational point m5 of the motor generator MG1 to the operational point m5' (toward lower direction in the drawing) such that an absolute value of the MG1 rotational velocity Nmg1 increase.

The above described change of the operational point is capable of suppressing (reducing) the range of the variation of the torque with respect to the electrical power which should be adjusted by the motor generator MG1. As a result, it is possible to suppress the variation of the engine rotational velocity NE of the engine 200, and to prevent the deterioration of the drivability which is caused by the electrical power adjusting process.

However, a heat efficiency of the engine 200 varies when the process which changes the operational point of the engine is performed. Especially, the heat efficiency decreases more easily when the operational point of the engine 200 is changed to the low rotational velocity side as illustrated in FIG. 22.

So, more preferably, the range at which the change of the operational point of the engine is allowed is limited to the range by which the decreased amount of the boost loss Lcv due to the intermittent process is larger than the decrease amount of the heat efficiency of the engine. The effect of the intermittent process can be kept (maintained) by the limitation of the range of the change of the operational point.

The present invention is not limited to the above described embodiment and may be changed, if desired, without departing from the essence or spirit of the invention which can be read from the claims and the entire specification. A control apparatus for a boost converter, which involves such changes, is also intended to be within the technical scope of the present invention.

INDUSTRIAL APPLICABILITY

The present invention can be applied to a system which boosts a source voltage by using a boost converter and drives a load apparatus.

REFERENCE SIGNS LIST 10 motor driving system
100 control apparatus
110 boost controlling unit
20 inverter controlling unit
200 boost converter
300 inverter
C capacitor
B DC electrical power source
MG, MG1, MG2 motor generator

The invention claimed is:

1. A control apparatus for a boost converter which controls the boost converter in an electrical power supply system, the electrical power supply system comprising:
   a DC (Direct Current) electrical power source having a source voltage;
   the boost converter which includes a switching device and configured to boost the source voltage and output the boosted source voltage to a load apparatus by a predetermined boost control including switching of a switching state of the switching device based on a boost instruction voltage; and
   a voltage sensor configured to detect an output voltage of the boost converter,
   the control apparatus comprising:
   a boost controlling unit configured to execute the boost control; and
   an intermittent controlling device configured to execute repeatedly an intermittent process of the boost control based on the detected output voltage to keep the output voltage within a range including the boost instruction voltage which is set in an immediately preceding execution of the boost control, wherein
   the intermittent controlling device starts the intermittent process of the boost control when the output voltage reaches the boost instruction voltage; and
   the intermittent controlling device stops the intermittent process of the boost control when the output voltage reaches a lower or a higher limiting value of a predetermined range of the boost instruction voltage.

2. The control apparatus for the boost converter according to claim 1, wherein the control apparatus further comprises a setting device configured to set the range on the basis of at least one of the source voltage, a withstand voltage of the boost converter, the boost instruction voltage and a loss generated when the load apparatus is driven.

3. The control apparatus for the boost converter according to claim 1, wherein the intermittent controlling device resumes the boost control when the output voltage exceeds a boundary value of the range in executing the intermittent process of the boost control.

4. The control apparatus for the boost converter according to claim 1, wherein the boost controlling unit varies the output voltage between the boost instruction voltage and the boundary value of the range in executing the intermittent process of the boost control.

5. The control apparatus for the boost converter according to claim 1, wherein
   the electrical power supply system further comprises a current sensor which detects a current flowing in the boost converter or the DC electrical power source,
   the intermittent controlling device starts the intermittent process of the boost control when the detected current is within a predetermined value.

6. The control apparatus for the boost converter according to claim 1, wherein the control apparatus further comprises an output change specifying unit which specifies a degree of a variation of an output of the DC electrical power source or the load apparatus,
   the intermittent controlling device starts the intermittent process of the boost control when the degree of the variation of the output of the DC electrical power source or the load apparatus is within a predetermined value.

7. The control apparatus for the boost converter according to claim 1, wherein the electrical power supply system is mounted on a vehicle.

8. The control apparatus for the boost converter according to claim 7, wherein the vehicle comprising at least one rotating electrical machine, as a driving power source of the vehicle, which is the load apparatus and which is capable of performing a power-running and a regeneration.

9. A control apparatus for a boost converter which controls the boost converter in an electrical power supply system,
the electrical power supply system comprising:
a DC (Direct Current) electrical power source having a source voltage;
the boost converter which includes a switching device and configured to boost the source voltage and output the boosted source voltage to a load apparatus by a predetermined boost control including switching of a switching state of the switching device based on a boost instruction voltage; and
a voltage sensor configured to detect an output voltage of the boost converter,
the control apparatus comprising:
a boost controlling unit configured to execute the boost control; and
an intermittent controlling device configured to execute repeatedly an intermittent process of the boost control based on the detected output voltage to keep the output voltage within a range including the boost instruction voltage which is set in an immediately preceding execution of the boost control, wherein
the electrical power supply system is mounted on a vehicle;
the vehicle is a hybrid vehicle which comprises:
an engine;
a first rotating electrical machine which is the load apparatus and which is capable of performing a power-running and a regeneration;
a differential mechanism comprising a plurality of rotating elements, the plurality of rotating elements are capable of differentially rotating and include a first rotating element which is connected to the first rotating electrical machine, a second rotating element which is connected to the engine and a third rotating element which is connected to a driving shaft being connected to an axle shaft; and
a second rotating electrical machine which is connected to the driving shaft, which is the load apparatus and which is capable of performing a power-running and a regeneration,
the controller is configured to start the intermittent process of the boost control when a difference between an input and output of the electrical power of the first and second rotating electrical machines is within a predetermined value in the case where one of the first and second rotating electrical machines is in a power-running state and the other one of the first and second rotating electrical machines is in a regeneration state.

10. The control apparatus for the boost converter according to claim 9, wherein the controller is further configured to control the first and second rotating electrical machines and the engine to balance the input and output of the electrical power, when the start of the intermittent process of the boost control is subject to the difference between the input and output of the electrical power being within the predetermine value.

11. The control apparatus for the boost converter according to claim 10, wherein the controller is configured to change an operation point of the engine by changing a rotational number of the first rotating electrical machine in balancing the input and output of the electrical power.

12. The control apparatus for the boost converter according to claim 11, wherein the controller is configured to change the operation point of the engine under such a condition that a reduction amount of a loss due to the intermittent process of the boost control exceeds an increasing amount of a loss due to the change of the operation point of the engine.

* * * * *